US010364738B2

(12) United States Patent
VanDerWege

(10) Patent No.: US 10,364,738 B2
(45) Date of Patent: Jul. 30, 2019

(54) PRE-CHAMBER IGNITION SYSTEM

(71) Applicant: Ford Global Technologies, LLC, Dearborn, MI (US)

(72) Inventor: Brad Alan VanDerWege, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 134 days.

(21) Appl. No.: 15/346,464

(22) Filed: Nov. 8, 2016

(65) Prior Publication Data

US 2018/0128157 A1   May 10, 2018

(51) Int. Cl.
| | |
|---|---|
| *F02B 19/04* | (2006.01) |
| *F02M 26/13* | (2016.01) |
| *F02B 19/12* | (2006.01) |
| *F02B 19/16* | (2006.01) |

(52) U.S. Cl.
CPC .............. *F02B 19/04* (2013.01); *F02B 19/12* (2013.01); *F02B 19/16* (2013.01); *F02M 26/13* (2016.02); *Y02T 10/125* (2013.01)

(58) Field of Classification Search
CPC .......... F02B 19/04; F02B 19/16; F02B 19/12; F02M 26/13
See application file for complete search history.

(56) References Cited

U.S. PATENT DOCUMENTS

| | | | | | |
|---|---|---|---|---|---|
| 3,386,422 | A | * | 6/1968 | Eyzat | F02B 3/06 123/259 |
| 3,583,372 | A | * | 6/1971 | Hoffmann | F02B 19/14 123/269 |
| 4,483,289 | A | * | 11/1984 | Paul | F02B 19/04 123/263 |
| 5,025,765 | A | * | 6/1991 | Kawamura | F02B 19/04 123/254 |
| 5,277,159 | A | * | 1/1994 | Webster | F02B 19/04 123/254 |
| 6,095,111 | A | * | 8/2000 | Ueda | F02B 19/108 123/254 |
| 7,922,551 | B2 | | 4/2011 | Tozzi | |
| 9,567,896 | B2 | * | 2/2017 | Pouring | F02B 19/12 |
| 2012/0103302 | A1 | | 5/2012 | Attard | |
| 2015/0037738 | A1 | * | 2/2015 | McAlister | F02M 57/06 431/6 |
| 2017/0122184 | A1 | * | 5/2017 | Hampson | F02D 41/0027 |
| 2017/0284323 | A1 | * | 10/2017 | Hagari | F02M 26/47 |

FOREIGN PATENT DOCUMENTS

EP     2444621 B1     6/2015

* cited by examiner

*Primary Examiner* — Joseph J Dallo
*Assistant Examiner* — Kurt Philip Liethen
(74) *Attorney, Agent, or Firm* — Julia Voutyras; McCoy Russell LLP

(57) ABSTRACT

Methods and systems are provided for a pre-chamber ignition system. In one example, a pre-chamber ignition system may include a pre-chamber extending into a combustion chamber, a piston protrusion shaped to fit through a bottom aperture of the pre-chamber, and a plurality of orifices formed by sidewall of the pre-chamber. A method for the pre-chamber ignition system includes adjusting spark timing within the pre-chamber and pressing the protrusion into the pre-chamber to ignite air/fuel within a main chamber.

19 Claims, 9 Drawing Sheets

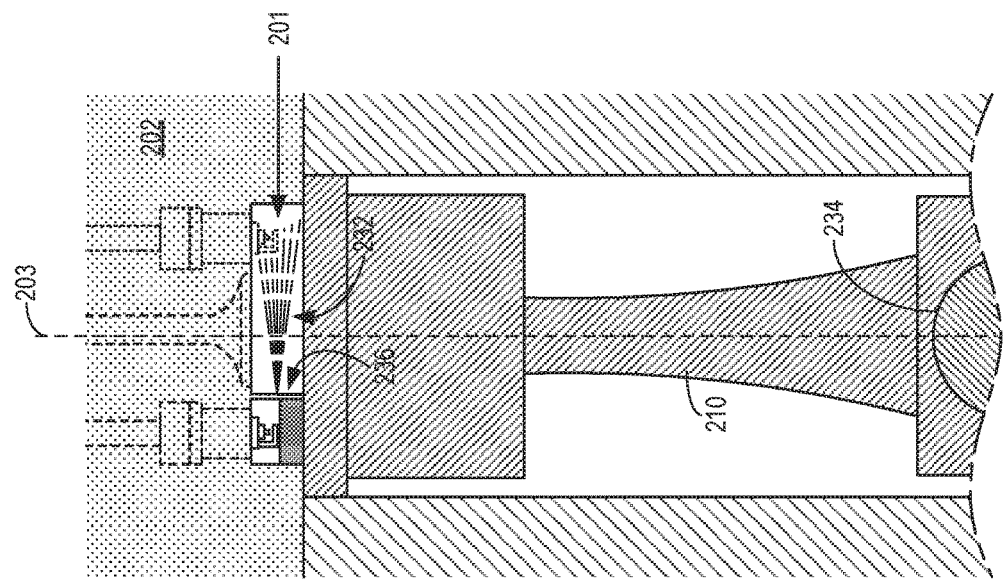
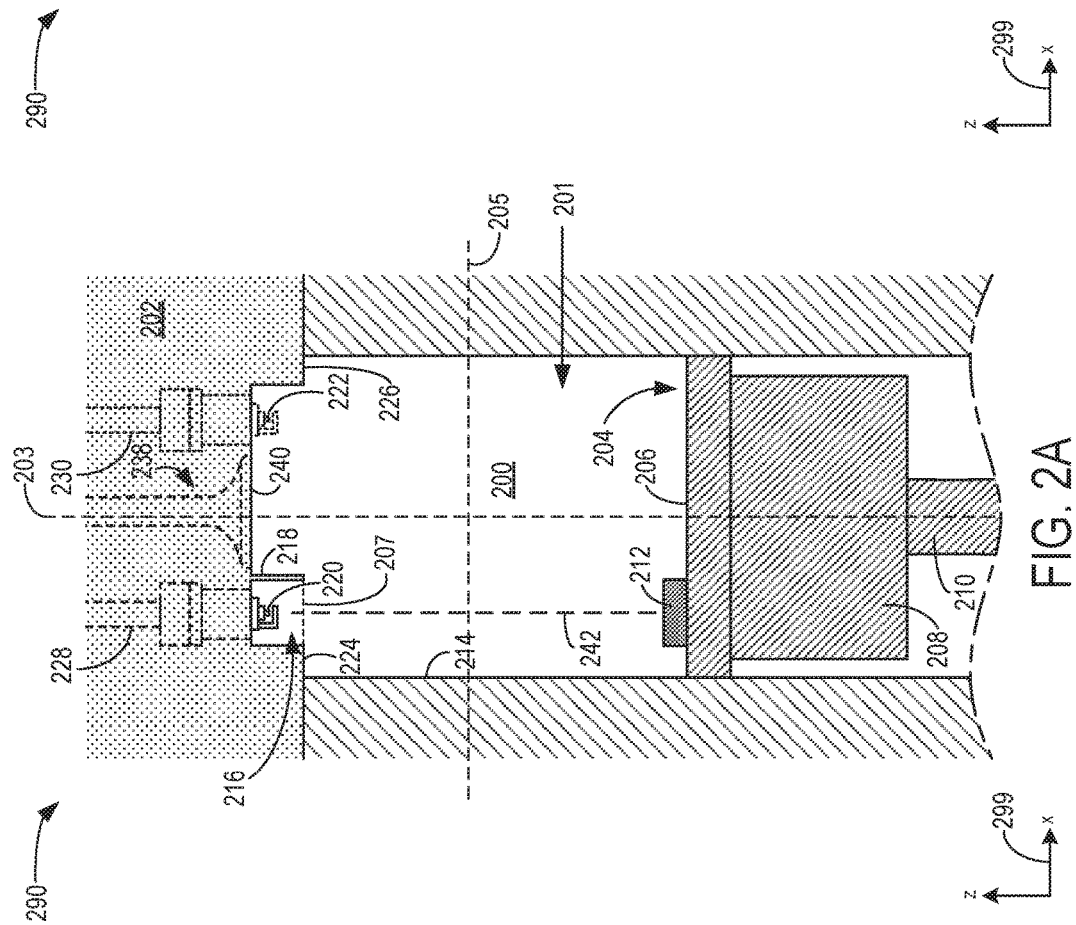

ized for engine operating conditions in which a relatively large amount of EGR gases are mixed with fresh intake air. For example,

PRE-CHAMBER IGNITION SYSTEM

FIELD

The present description relates generally to methods and systems for a pre-chamber ignition system for an internal combustion engine.

BACKGROUND/SUMMARY

An internal combustion engine includes a plurality of cylinders formed by an engine block. Each cylinder is capped by a cylinder head, and the cylinders and cylinder head together form a plurality of combustion chambers. Each combustion chamber includes a piston disposed therein. In one example, the internal combustion engine may be supplied with fuel (e.g., gasoline, diesel, etc.) by a plurality of fuel injectors. Each combustion chamber is configured to combust a mixture of fuel and a combustible gas (e.g., air). The combustion chambers receive air via an intake system including one or more intake ports coupled to each combustion chamber. Each intake port includes an intake valve disposed therein. The injected fuel and air may mix and be combusted within each combustion chamber. The resulting gases from combustion may then exit each combustion chamber via an exhaust system including one or more exhaust ports coupled to each combustion chamber, with separate exhaust valves disposed within each exhaust port.

Vehicles including an internal combustion engine configured for direct injection as described above may additionally include an exhaust gas recirculation (EGR) system. The EGR system diverts a portion of the exhaust gases from the exhaust system back to the intake system to cool combustion temperatures and reduce throttling losses, thus improving vehicle emissions and fuel economy. However, in some examples, diluting intake gases with exhaust gases via the EGR system may result in combustion instability and reduced combustion rates.

Attempts to address combustion instability and reduced combustion rates include fluidly coupling each combustion chamber with a separate pre-chamber. One example approach is shown by Attard in U.S. Patent No. 2012/0103302. Therein, an ignition system for an internal combustion engine is disclosed, with the ignition system including a pre-chamber coupled to a combustion chamber and formed within an interior of a cylinder head. The pre-chamber includes a nozzle positioned away from a proximal portion of the pre-chamber. An igniter portion of an ignition device ignites fuel within the pre-chamber, and partially combusted pre-chamber products are forced downward through orifices in the pre-chamber to ignite a main fuel charge within the combustion chamber. Another example approach is shown by Tozzi in U.S. Pat. No. 7,922,551. Therein, a spark plug including a cylindrical shell with a pre-chamber is disclosed, with the cylindrical shell capped by an endcap including a plurality of holes. Combustion of fuel/air may occur within the pre-chamber and a plume of combusted materials from the pre-chamber may ignite fuel/air within a main combustion chamber.

However, the inventors herein have recognized potential issues with such systems. As one example, a geometry of a pre-chamber (such as a pre-chamber formed by a cylindrical shell of a spark plug, or a pre-chamber formed within an interior of a cylinder head) may not be optimized for engine operating conditions in which a relatively large amount of EGR gases are mixed with fresh intake air. For example, although the pre-chamber may be configured to increase a combustibility of an air/fuel mixture by increasing a pressure and temperature of the mixture within the pre-chamber, combusted gases may become trapped within the pre-chamber, thereby inhibiting combustion during subsequent combustion cycles by diluting fresh intake air with the trapped gases within the pre-chamber.

In one example, the issues described above may be addressed by a system comprising: a combustion chamber formed by a cylinder capped by a cylinder head; a pre-chamber formed by the cylinder head, the pre-chamber extending away from the cylinder head and into the cylinder; and a piston disposed within the cylinder, the piston including a protrusion shaped to fit within the pre-chamber. As one example, the pre-chamber includes a plurality of orifices formed by a sidewall of the pre-chamber, and the protrusion of the piston presses into the pre-chamber through a bottom aperture of the pre-chamber. A tip of a first spark plug is disposed within the pre-chamber and may be actuated by a controller to ignite an air/fuel mixture within the pre-chamber. Partially combusted air/fuel mixture may spray outward from the orifices of the pre-chamber and into the combustion chamber, thereby igniting an air/fuel mixture within the combustion chamber. In another example, a spark timing of the pre-chamber may be adjusted by the controller in response to engine operating conditions. By configuring the system in this way, a pressure and temperature of air/fuel mixture within the pre-chamber may be increased, thereby increasing a combustibility of the air/fuel mixture. The combustion of the air/fuel mixture within the pre-chamber may be controlled by adjusting the spark timing within the pre-chamber, and engine performance may be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A-2B show side views of two example positions of a piston with a protrusion disposed within a combustion chamber including a pre-chamber.

FIGS. 2A-6 are shown to scale, though other relative dimensions may be used.

DETAILED DESCRIPTION

Figure 3:
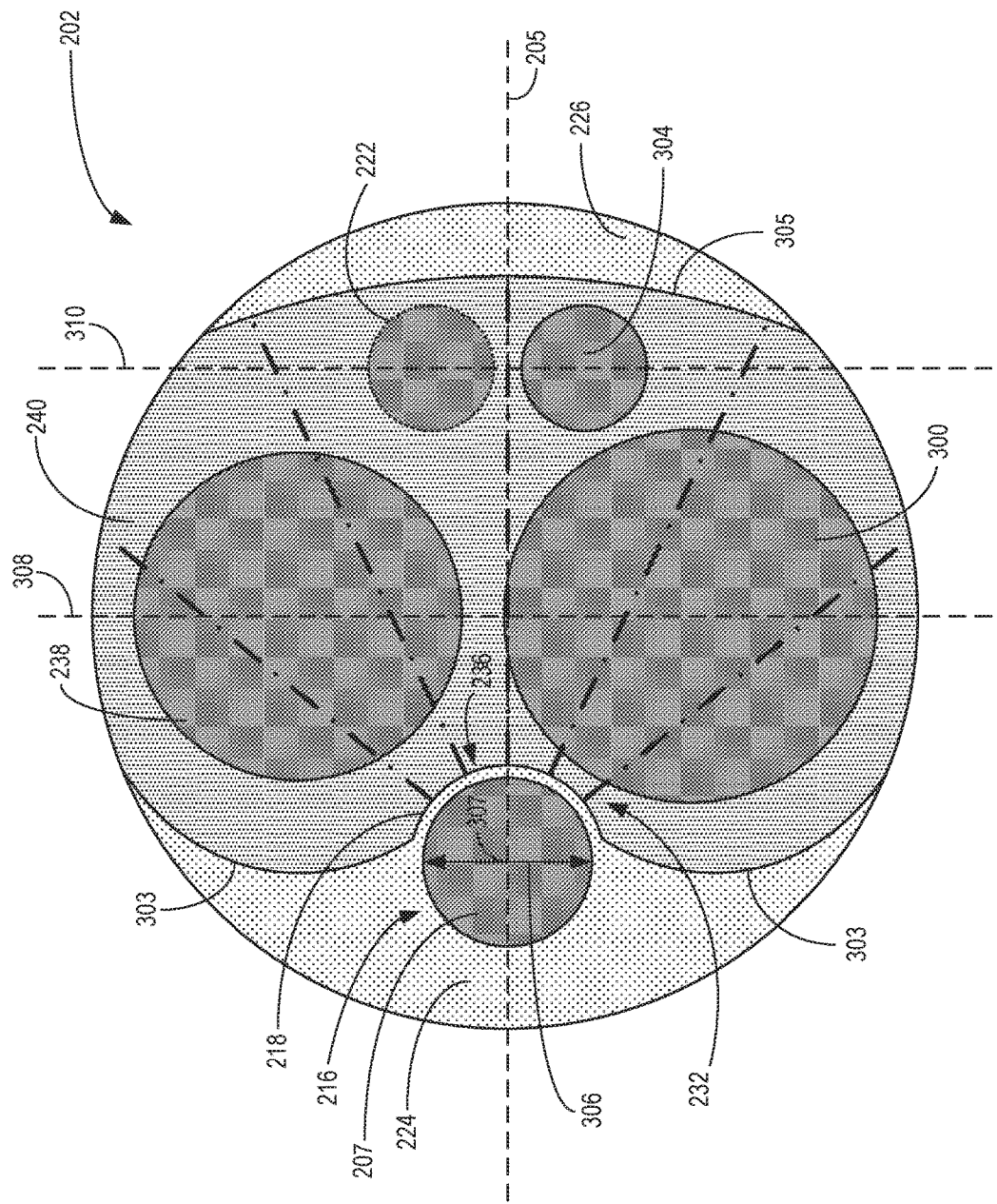
FIG. 3 shows a cylinder head capping the combustion chamber of FIGS. 2A-2B, as viewed from within the combustion chamber.
Figure 4:
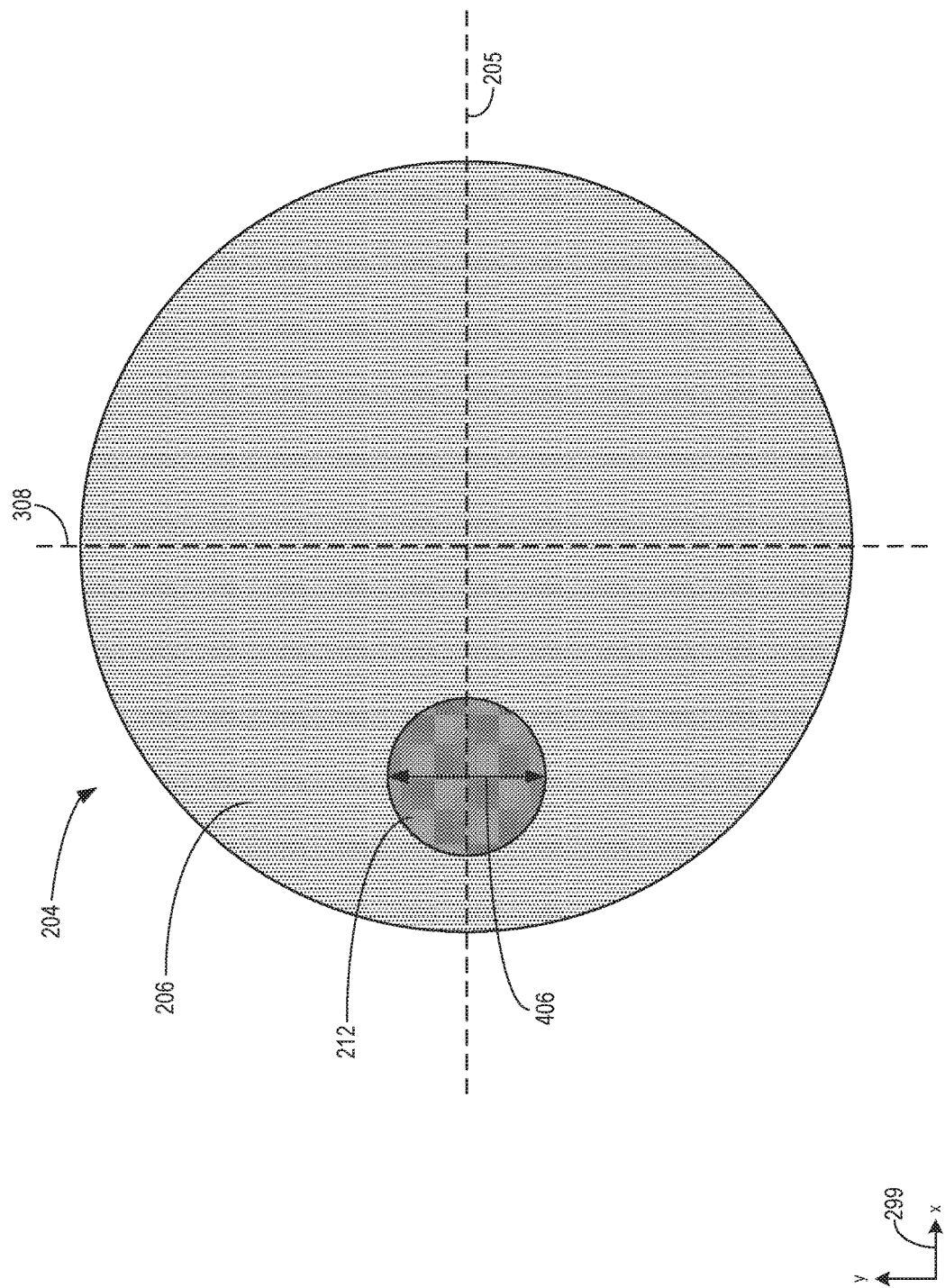
FIG. 4 shows the piston of FIGS. 2A-2B, as viewed from within the combustion chamber.
Figure 5:
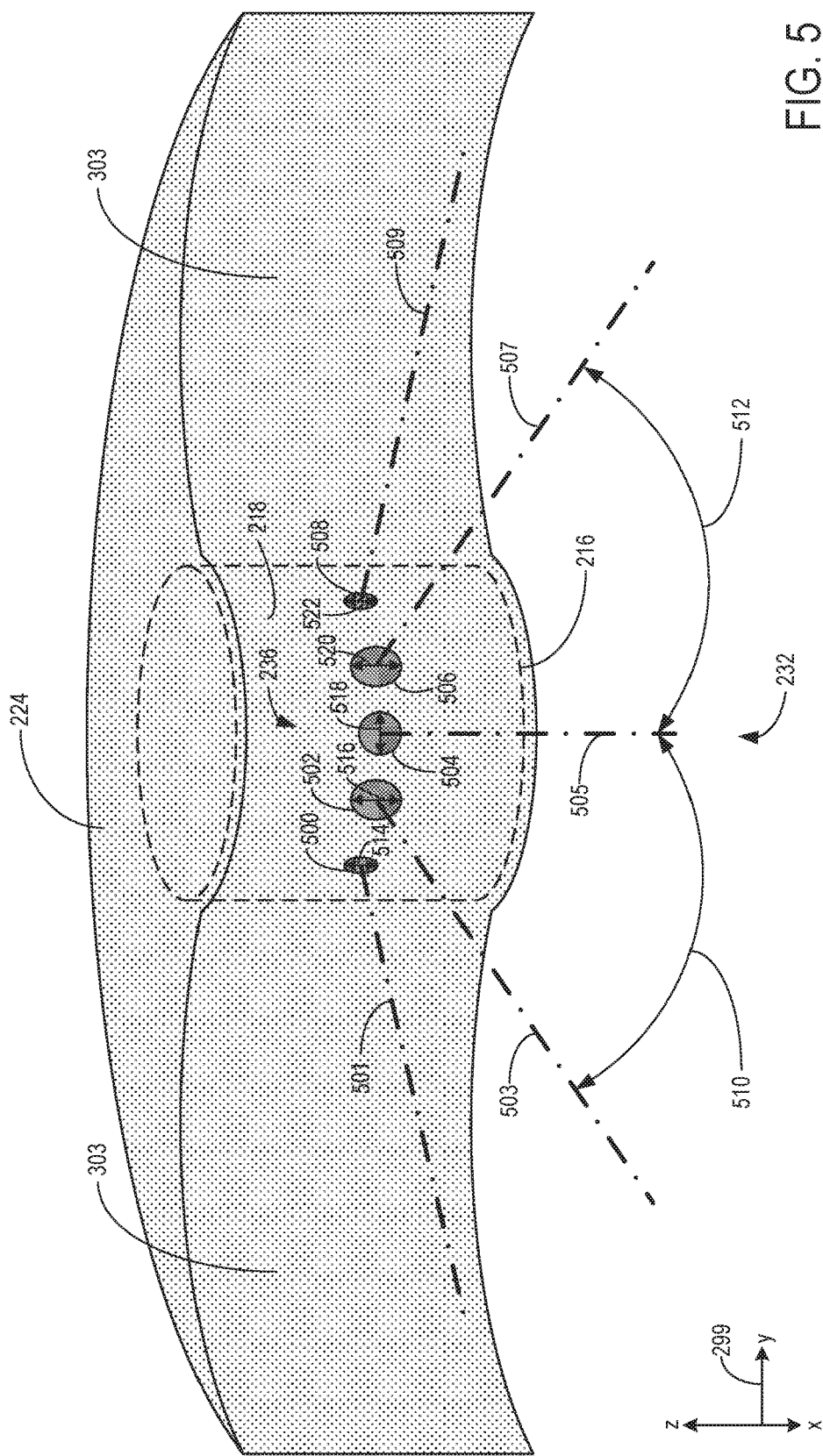
FIG. 5 shows a perspective view of the pre-chamber of FIGS. 2A-2B formed by the cylinder head.
Figure 6:
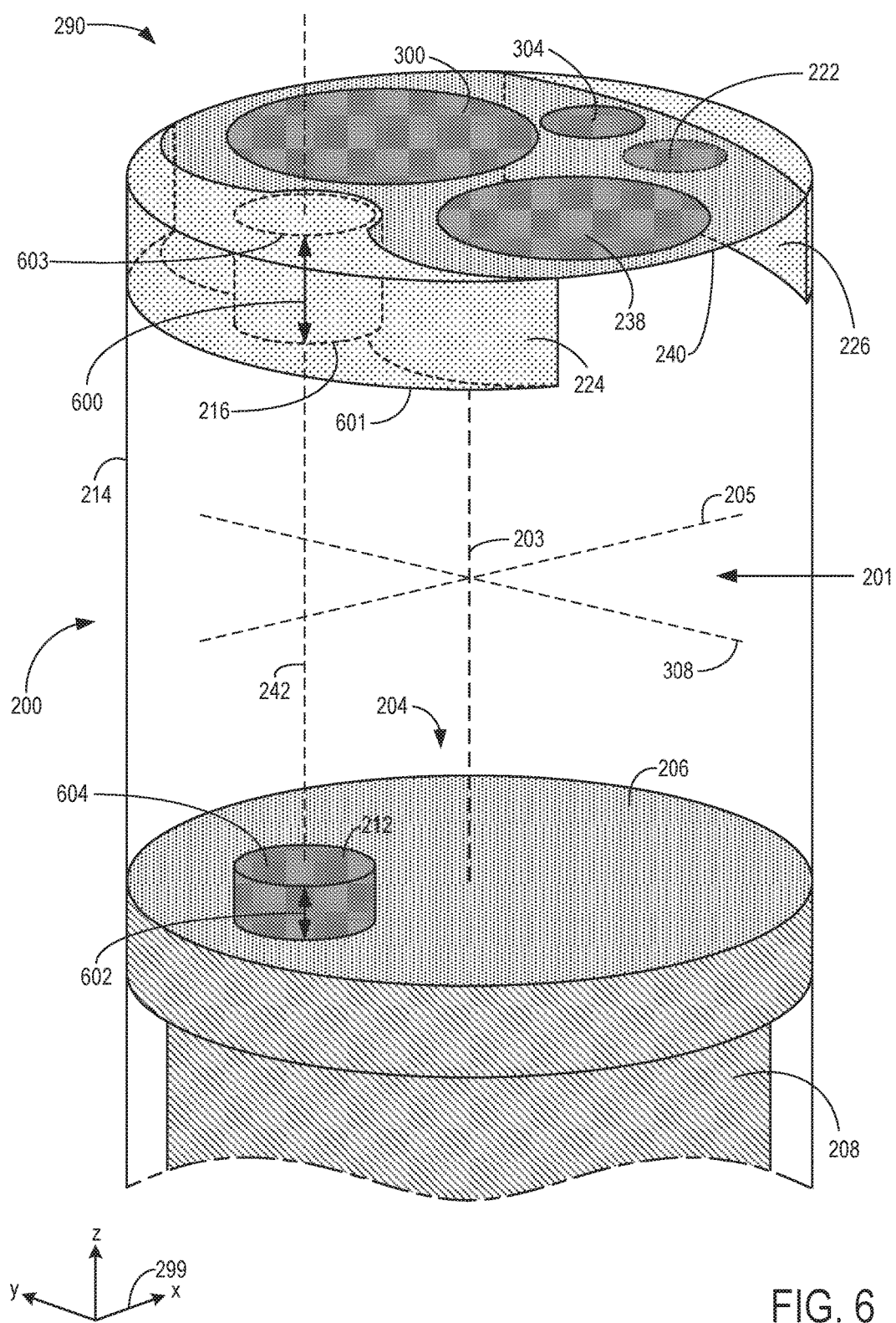
FIG. 6 shows a perspective view of the piston of FIGS. 2A-2B disposed within the combustion chamber and the cylinder head capping the combustion chamber.
Figure 7:
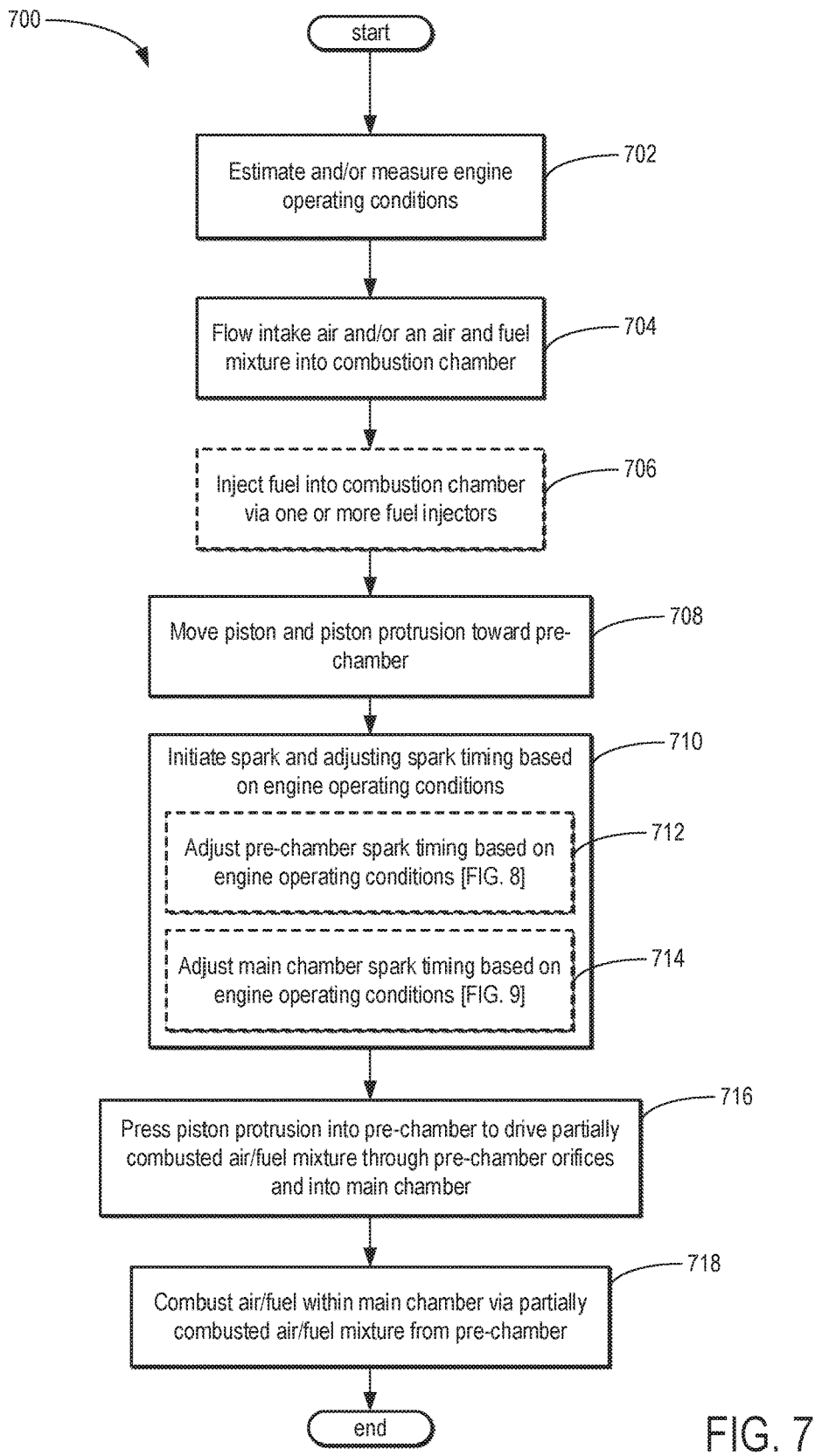
FIG. 7 illustrates an example method for pressing a piston protrusion into a pre-chamber disposed within a main combustion chamber and combusting an air/fuel mixture within the pre-chamber.

The following description relates to systems and methods for a pre-chamber ignition system for an internal combustion engine. An engine system, such as the engine system shown by FIG. 1, includes an internal combustion engine configured to combust a mixture of air and fuel. The engine includes at least one combustion chamber formed by an engine cylinder, a piston, and capped by a cylinder head. The combustion chamber includes a pre-chamber ignition system, such as the pre-chamber ignition system shown by FIGS. 2A-2B. The pre-chamber ignition system includes a pre-chamber formed by the cylinder head and disposed within the combustion chamber (as shown by FIG. 3), and a piston with a protrusion shaped to fit within the pre-chamber (as shown by FIG. 4). The fuel and air mixture may partially combust within the pre-chamber, and the partially combusted mixture may be driven through at least one orifice positioned along an outer perimeter of the pre-chamber (as shown by FIG. 5) by pressing the protrusion of the piston into the pre-chamber. In one example, the pre-chamber is positioned away from a centerline of the cylinder and the protrusion of the piston is positioned vertically in-line with the pre-chamber, as shown by FIG. 6. A method for combustion within the combustion chamber is shown by FIG. 7, with a plurality of steps for adjusting a spark timing of a spark plug disposed within the pre-chamber shown by FIG. 8, and a plurality of steps for adjusting a spark timing of a spark plug disposed within a main chamber of the combustion chamber shown by FIG. 9.

Figure 1:
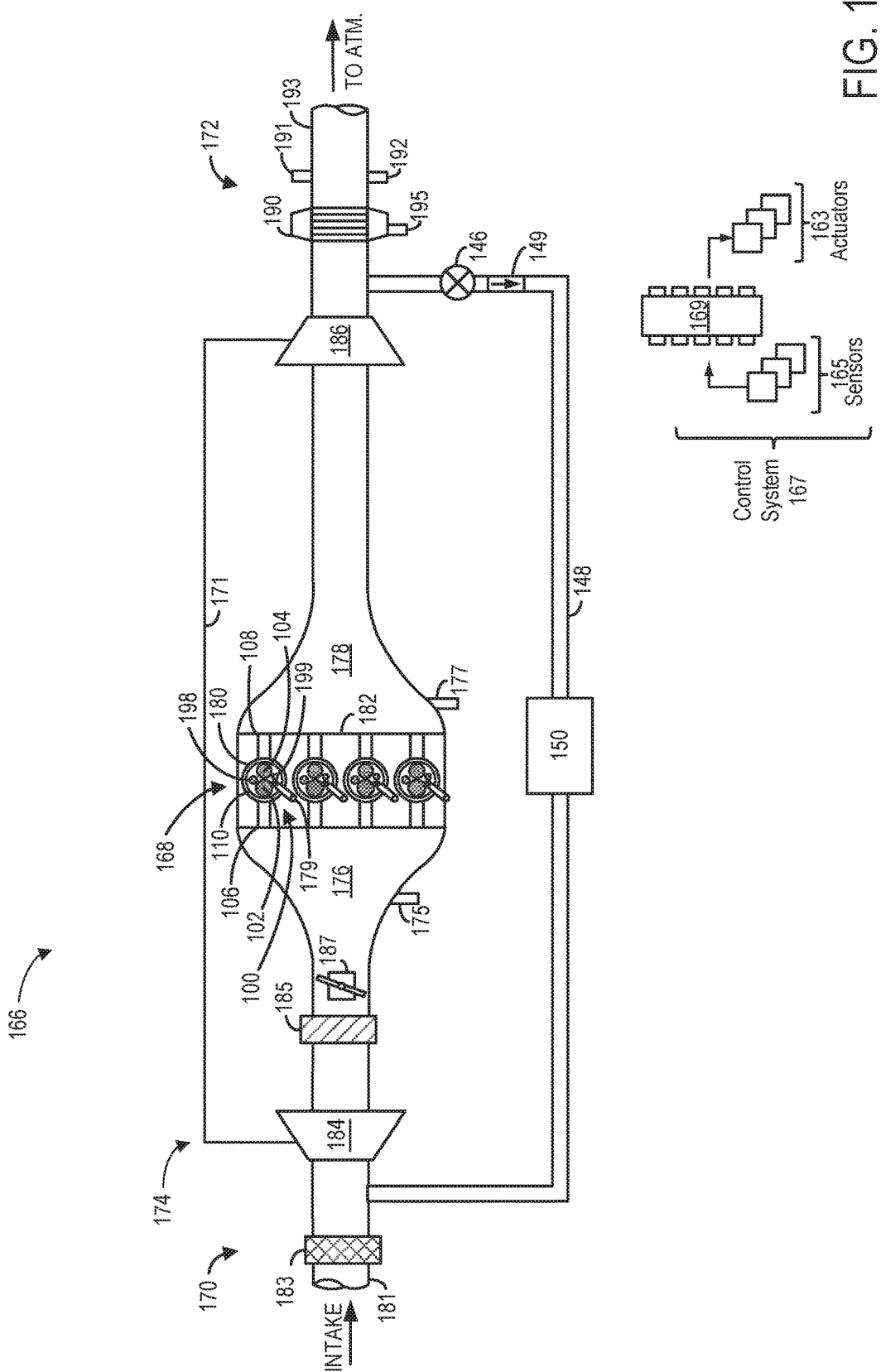
FIG. 1 schematically depicts an engine system including an internal combustion engine and at least one combustion chamber.

FIG. 1 schematically shows a combustion system 100 included within an example engine system 166. The combustion system 100 includes cylinder head 182 and a plurality of pistons (such as piston 110). Each piston is included within a separate combustion chamber of a plurality of combustion chambers (such as combustion chamber 180). The cylinder head 182 may form a top surface of each combustion chamber of the plurality of combustion chambers as described below with reference to FIGS. 2A-6. Engine system 166 (which includes combustion system 100) will be described herein with reference to FIG. 1, while components included in a combustion system such as the combustion system 100 (e.g., cylinder head surfaces, piston surfaces, etc.) are described in further detail below following the description of FIG. 1 and with reference to FIGS. 2A-6.

The schematic depicted by FIG. 1 shows engine system 166, with engine system 166 including an engine 168, an intake system 170, an exhaust system 172, and the combustion system 100. The engine 168 may also include a turbocharger 174 with a compressor 184 arranged within the intake system 170 and a turbine 186 arranged within the exhaust system 172. The compressor 184 is coupled to the turbine 186 by a shaft 171 and driven by the rotational motion of the turbine 186. Specifically, fresh air is introduced along intake passage 181 into engine 168 via air cleaner 183 and flows to compressor 184. The compressor may be any suitable intake-air compressor, such as a motor-driven or driveshaft driven supercharger compressor. In engine system 166, however, the compressor is a turbocharger compressor mechanically coupled to turbine 186 via shaft 171, and the turbine 186 is driven to rotate by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed.

As shown in FIG. 1, compressor 184 is coupled, through charge-air cooler 185 to throttle valve 187. Throttle valve 187 is coupled to engine intake manifold 176. From the compressor, the compressed air charge flows through the charge-air cooler 185 and the throttle valve 187 to the intake manifold 176. The charge-air cooler 185 may be an air-to-air or air-to-water heat exchanger, for example. In the embodiment shown in FIG. 1, the pressure of the air charge within the intake manifold 176 is sensed by manifold air pressure (MAP) sensor 175. A compressor by-pass valve (not shown) may be coupled in series between the inlet and the outlet of compressor 184. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 176 is coupled to a plurality of combustion chambers (such as combustion chamber 180) through a plurality of intake ports (such as intake port 106). Each intake port includes at least one intake valve (such as intake valve 102). The combustion chambers (which may be referred to herein as cylinders) are further coupled to exhaust manifold 178 via a plurality of exhaust ports (such as exhaust port 108). Each exhaust port includes at least one exhaust valve (such as exhaust valve 104). The combustion chambers 180 are capped by cylinder head 182 and may be coupled with fuel injectors (such as fuel injector 179). Each combustion chamber includes a piston (such as piston 110), a pre-chamber (such as pre-chamber 198), and may include one or more spark plugs (such as spark plug 199). An embodiment of a combustion chamber including a pre-chamber and piston are shown by FIGS. 2A-6 and described further below. In the depicted embodiment, a single exhaust manifold 178 is shown. However, in other embodiments, the exhaust manifold may include a plurality of exhaust manifold sections. In the embodiment shown in FIG. 1, the pressure of the exhaust gases within the exhaust manifold 178 is sensed by manifold air pressure (MAP) sensor 177.

During operation, each combustion chamber (such as combustion chamber 180) within engine 168 typically undergoes a four stroke cycle. The four stroke cycle includes an intake stroke, compression stroke, expansion stroke (which may be referred to herein as a power stroke), and exhaust stroke. As an example of operation of combustion chamber 180, the exhaust valve 104 may close and the intake valve 102 may open during the intake stroke. Air is introduced into the combustion chamber via intake manifold 176, and the piston 110 moves to the bottom of the combustion chamber so as to increase the volume within the combustion chamber. The position at which the piston is near the bottom of the combustion chamber and at the end of its stroke (e.g., when the combustion chamber is at its largest volume) is typically referred to by those of skill in the art as bottom dead center (BDC). During the compression stroke, the intake valve and the exhaust valve are typically closed. The piston moves toward the cylinder head 182 so as to compress the air within the combustion chamber. The point at which the piston is at the end of its stroke and closest to the cylinder head (e.g., when the combustion chamber is at its smallest volume) is typically referred to by those of skill in the art as top dead center (TDC).

In a process which may herein be referred to as injection, fuel is introduced into the combustion chamber. In one example, fuel may be mixed with intake air at a location upstream of the combustion chamber, and the air and fuel mixture may flow into the combustion chamber via an intake port (e.g., intake port 106). In another example, fuel may be injected directly into the combustion chamber via a fuel injector (e.g., fuel injector 179) and may mix with intake air within the combustion chamber. In a process hereinafter referred to as ignition, the air and fuel mixture is ignited by known ignition means such as one or more spark plugs (such as the spark plugs shown by FIGS. 2A-2B, FIG. 3, and FIG. 6), resulting in combustion. During the expansion stroke, the expanding gases push the piston back to BDC. A crankshaft (such as the crankshaft shown by FIG. 2B) converts piston movement into a rotational torque of the crankshaft. Finally, during the exhaust stroke, one or more exhaust valves open to release the combusted air-fuel mixture to exhaust manifold 178 and the piston returns to TDC. Note that the above is shown merely as an example, and that intake and exhaust valve opening and/or closing timings may vary, such as to provide positive or negative valve overlap, late intake valve closing, or various other examples.

Engine 168 may be controlled at least partially by a control system 167 including controller 169 and by input from a vehicle operator via an input device (not shown). Control system 167 is configured to receive information from a plurality of sensors 165 (various examples of which are described herein) and sending control signals to a plurality of actuators 163. As one example, sensors 165 may include temperature sensor 191 coupled to exhaust conduit 193, temperature sensor 195 coupled to emission control device 190, manifold air pressure sensor 175 coupled to intake manifold 176, and manifold air pressure sensor 177 coupled to exhaust manifold 178. Various exhaust gas sensors may also be included in exhaust system 172, within and/or downstream of exhaust manifold 178, such as particulate matter (PM) sensors, temperature sensors, pressure sensors, NOx sensors, oxygen sensors, ammonia sensors, hydrocarbon sensors, etc. Other sensors such as additional pressure, temperature, air/fuel ratio and composition sensors may be coupled to various locations in the engine system 166. As another example, actuators 163 may include fuel injector 179, valve 146 coupled to low-pressure exhaust gas recirculation (EGR) passage 148, intake valve 102, exhaust valve 104, and throttle valve 187. Other actuators, such as a variety of additional valves and throttles, may be coupled to various locations in engine system 166. Controller 169 may receive input data from the various sensors, process the input data, and trigger the actuators in response to the processed input data based on instruction or code programmed therein corresponding to one or more routines.

Controller 169 may be a microcomputer, and may include a microprocessor unit, input/output ports, an electronic storage medium for executable programs and calibration values such as a read only memory chip, random access memory, keep alive memory, and/or a data bus. Controller 169 may receive various signals from sensors coupled to engine 168, in addition to those signals previously discussed, including measurement of inducted mass air flow (MAF) from a mass air flow sensor; engine coolant temperature (ECT) from a temperature sensor coupled to a cooling sleeve; a profile ignition pickup signal (PIP) from a Hall effect sensor (or other type) coupled to a crankshaft; throttle position (TP) from a throttle position sensor; absolute manifold pressure signal (MAP) from one or more intake and exhaust manifold sensors, cylinder air/fuel ratio from an exhaust gas oxygen sensor, and abnormal combustion from a knock sensor and a crankshaft acceleration sensor. Engine speed signal, RPM, may be generated by controller 169 from signal PIP. Manifold pressure signal MAP from a manifold pressure sensor may be used to provide an indication of vacuum, or pressure, in the intake manifold.

Storage medium read-only memory can be programmed with computer readable data representing instructions executable by a processor for performing the methods described below as well as other variants that are anticipated but not specifically listed. Example routines may include adjusting spark plug timing (e.g., adjusting a timing of actuation of a spark plug to produce a spark) in response to engine operating conditions, as described in further detail with reference to FIGS. 7-9.

In embodiments where at least one intake or exhaust valve is configured to open and close according to an adjustable timing, the adjustable timing may be controlled via the electronic control system to regulate an amount of exhaust present in a combustion chamber during ignition. For example, in one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as desired for combustion and emissions-control performance. The electronic control system may also be configured to command the opening, closure and/or adjustment of various other electronically actuated valves in the engine system (e.g., throttle valves, compressor by-pass valves, waste gates, EGR valves and shut-off valves, secondary air valves, various reservoir intake and exhaust valves, etc.) to enact any of the control functions described herein. Further, to assess operating conditions in connection with the control functions of the engine system, the electronic control system may be operatively coupled to a plurality of sensors arranged throughout the engine system-flow sensors, temperature sensors, pedal-position sensors, pressure sensors, etc.

Combustion chambers 180 may be supplied one or more fuels as described above, such as gasoline, alcohol fuel blends, diesel, biodiesel, compressed natural gas, etc. Fuel may be supplied to the combustion chambers via direct injection, port injection, throttle valve-body injection, or any combination thereof. In the combustion chambers, combustion may be initiated via spark ignition (via one or more spark plugs, such as those shown by FIGS. 2A-2B) and/or compression ignition.

As shown in FIG. 1, exhaust from the one or more exhaust manifold sections is directed to turbine 186 to drive the turbine 186, where it then flows through emission control device 190. In alternate embodiments (not shown), the engine system may possess a different number, arrangement, and/or relative processing capacity of emission control devices. Emission control device 190 may include one or more exhaust after-treatment catalysts configured to catalytically treat the exhaust flow, and thereby reduce an amount of one or more substances in the exhaust flow. For example, one exhaust after-treatment catalyst may be configured to trap NOx from the exhaust flow when the exhaust flow is lean, and to reduce the trapped NOx when the exhaust flow is rich. In other examples, an exhaust after-treatment catalyst may be configured to disproportionate NOx or to selectively reduce NOx with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regenerable soot filter configured to trap and oxidize soot particles in the exhaust flow.

All or part of the treated exhaust from emission control device 190 may be released into the atmosphere via exhaust conduit 193. Temperature sensor 191 and flow sensor 192 are coupled to exhaust conduit 193 to monitor operating conditions. Additional sensors (not shown) may be included to detect exhaust pressure, composition, etc. Depending on operating conditions, some exhaust may be diverted instead to low-pressure (LP) EGR passage 148 via valve 146. An inlet port of an EGR cooler 150 is fluidically coupled with the LP EGR passage 148 to permit exhaust gases to flow through the EGR cooler 150 toward the intake system 170. In this manner, the engine system 166 is configured to admit exhaust tapped from upstream of emission control device 190 and downstream of the exhaust manifold 178. The valve 146 may be opened to admit a controlled amount of exhaust gas to the intake system 170 for desirable gas composition. A check valve 149 is included within LP EGR passage 148 downstream of the valve 146 to reduce a likelihood of flowing contents from the intake system 170 through LP EGR passage 148 towards the exhaust system 172. In this way, engine system 166 is adapted to adjustably flow exhaust gases from the exhaust system 172 to the intake system 170.

Embodiments of a pre-chamber ignition system included within the combustion system 100 are described in further detail below with reference to FIGS. 2A-6. The example configuration of the engine system 166 described above is a non-limiting example and alternate embodiments of the engine system may include additional components not shown (e.g., one or more EGR coolers, heat exchangers, etc.). Alternate embodiments may also include a different number of combustion chambers, intake and/or exhaust valves, etc.

Reference axes 299 are included throughout FIGS. 2A-6 in order to provide a relative reference between each view. FIGS. 2A-6 each show the pre-chamber ignition system of the combustion system (e.g., a combustion system similar to combustion system 100 shown and described above with reference to FIG. 1) from different views. In other words, a same embodiment of the pre-chamber ignition system is shown by FIGS. 2A-6, but each of FIGS. 2A-6 shows the pre-chamber ignition system from a different perspective. For example, FIGS. 2A-2B show a cross-sectional profile of the pre-chamber ignition system, FIG. 3 shows a view of a top surface of a combustion chamber of the pre-chamber ignition system, FIG. 4 shows a view of a top surface of a piston of the pre-chamber ignition system, FIG. 5 shows a perspective view of a pre-chamber of the pre-chamber ignition system, and FIG. 6 shows an approximately isometric view of the combustion chamber of the pre-chamber ignition system. Due to the depiction of the embodiment throughout FIGS. 2A-6 as described above, similar parts between figures may be labeled similarly and not re-introduced.

FIG. 2A and FIG. 2B each show a pre-chamber ignition system 290 including a combustion chamber 201 formed by interior walls 214 of a cylinder 200 and capped by a cylinder head 202. The combustion chamber 201 includes a piston 204 disposed therein, and the piston 204 is configured to move linearly along a central axis 203 of the cylinder 200. Piston 204 includes a protrusion 212 shaped to fit within a pre-chamber 216. The pre-chamber 216 is formed by the cylinder head 202 and extends into the combustion chamber 201. FIG. 2A shows the piston 204 in a bottom-dead-center (BDC) position, while FIG. 2B shows the piston 204 in a top-dead-center (TDC) position. In one example, the BDC position may correspond to a beginning of a compression stroke of a single engine cycle, and the TDC position may correspond to an end of the compression stroke of the single engine cycle, as described above with reference to FIG. 1. Although the cylinder head 202 may include at least one intake valve, at least one exhaust valve, and at least one respective intake/exhaust passage coupled with each valve, in the views shown by FIGS. 2A-2B only exhaust valve 238 is shown. However, it should be understood that cylinder head 202 may include intake/exhaust valves and passages not shown by FIGS. 2A-2B (such as intake valve 300 shown by FIG. 3 and FIG. 5). A horizontal centerline 205 is shown by FIG. 2A for comparison of relative positioning of components shown by FIGS. 3-4 and FIG. 6 and described below.

The piston 204 includes crown 206 and skirt 208, and the skirt 208 is coupled with connecting rod 210. Connecting rod 210 transmits the linear motion of piston 204 into a rotational motion of crankshaft 234 (shown by FIG. 2B). The protrusion 212 is formed as an extension of the crown 206 and extends into the combustion chamber 201. As described below, the protrusion 212 is shaped to fit within the pre-chamber 216 and is positioned vertically in-line with the pre-chamber 216 as indicated by vertical axis 242. In other words, when the piston 204 moves along the central axis 203 toward the cylinder head 202 and into the TDC position shown by FIG. 2B, the protrusion 212 moves along with the piston and along the vertical axis 242 such that the protrusion 212 presses into the pre-chamber 216.

As mentioned above, the pre-chamber 216 is formed by the cylinder head 202 and extends away from the cylinder head 202 and into the combustion chamber 201. In other words, the pre-chamber 216 is positioned vertically below a top surface 240 of the combustion chamber 201 (e.g., a surface at which valves, such as exhaust valve 238, are seated). The pre-chamber 216 extends away from the cylinder head 202 and in a direction toward the BDC position of the piston 204. In the embodiment shown by FIGS. 2A-6, the pre-chamber 216 is formed by a first extended region 224 (which may be referred to herein as first squish region 224) of the cylinder head 202 and is shaped such that a bottom side of the pre-chamber 216 (e.g., a side positioned closest to the BDC position of the piston 204) is open to the combustion chamber 201. In other words, the pre-chamber 216 includes a bottom aperture 207 (indicated by a dashed line in FIG. 2A). A second extended region 226 (which may be referred to herein as second squish region 226) is formed by the cylinder head 202 and is positioned opposite to the first squish region in a direction perpendicular with the central axis 203. In this configuration, when the piston 204 is in the TDC position, the combustion chamber 201 is defined as an open volume (e.g., open space) spanning between the first squish region 224, the second squish region 226, the piston crown 206, and the top surface 240. When the piston 204 moves toward the TDC position, the protrusion 212 presses into the pre-chamber 216 through the bottom side of the pre-chamber 216.

The pre-chamber 216 includes a plurality of orifices 236 (indicated by an arrow in FIG. 2B) formed by a sidewall 218 of the pre-chamber 216. The orifices 236 are arranged such that when the protrusion 212 of the piston 204 enters the pre-chamber 216 through the bottom side of the pre-chamber 216 (e.g., through the bottom aperture 207), gases (e.g., air, or an air/fuel mixture) within the pre-chamber 216 may be forcibly expelled from the pre-chamber 216 and into the combustion chamber 201 through the orifices 236. For example, in the embodiment shown by FIGS. 2A-6, a first spark plug 228 is coupled with the cylinder head 202 in a position such that a first spark tip 220 of the first spark plug 228 extends from the cylinder head 202 and into the pre-chamber 216. During engine operation, a controller (e.g., controller 169 shown by FIG. 1 and described above) may send a signal to an actuator of the first spark plug 228 in order to produce a spark at the first spark tip 220 and ignite an air/fuel mixture within the pre-chamber 216. In one example, the spark may be produced when the protrusion 212 is fully inserted into the pre-chamber 216. Other examples are described below with reference to FIGS. 7-9.

As the air/fuel mixture combusts within the pre-chamber 216, combusted materials 232 (e.g., partially combusted air/fuel) spray from the pre-chamber 216 and into the combustion chamber 201 via the orifices 236, thereby igniting an air/fuel mixture within the combustion chamber 201. The pre-chamber 216 is positioned such that the combusted materials 232 spray from the pre-chamber 216 in directions perpendicular with the central axis 203. For example, when the piston 204 is in the TDC position (as shown by FIG. 2B), a size of the combustion chamber 201 is reduced relative to a size of the combustion chamber 201 when the piston 204 is in the BDC position (as shown by FIG. 2A). The orifices 236 are positioned such that combusted materials 232 spray from the pre-chamber 216 in a direction toward the second squish region 226 in order to mix evenly with (and ignite) the uncombusted air/fuel mixture in the combustion chamber 201.

In FIGS. 2A-2B, FIG. 3, and FIG. 6, a position of a second spark plug 222 is indicated by a dashed outline. In some embodiments, second spark plug 222 may be included in order to increase an amount of control over combustion timing within the combustion chamber 201. For example, during engine operating conditions in which a ratio of EGR gases to intake air within the combustion chamber 201 is high, second spark plug 222 may be actuated by the controller along with the first spark plug 228 in order to reduce a likelihood of combustion chamber misfire. In such examples, a timing of second spark plug 222 may be different than a timing of first spark plug 222 and may be adjusted independently by the controller in response to engine operating conditions, as described below with reference to FIGS. 7-9.

FIG. 3 shows a view of the cylinder head 202 described above with reference to FIGS. 2A-2B in a view from vertically below the cylinder head 202 (e.g., as viewed from within the combustion chamber 201 at the BDC position). The cylinder head 202 is coupled with intake valve 300 and exhaust valve 238. In this embodiment (e.g., the embodiment shown by FIGS. 2A-6), the cylinder head 202 is additionally coupled with a fuel injector 304 and second spark plug 222. Alternate embodiments may not include the fuel injector 304 and/or second spark plug 222. For example, in embodiments including port fuel injection (e.g., embodiments in which fuel and air are mixed upstream of the combustion chamber 201, such as in intake port 106 shown by FIG. 1), fuel injector 304 may be omitted (e.g., not coupled with cylinder head 202). Additionally, alternate embodiments may include a different number, position, size, etc. of intake valves, exhaust valves, and associated ports/passages.

An example of a relative positioning of the intake valve 300, exhaust valve 238, fuel injector 304, second spark plug 222, and pre-chamber 216 is shown by FIG. 3. In this example, the intake valve 300 and exhaust valve 238 are each centered along a first axis 308, and the fuel injector 304 and second spark plug 222 are each centered along a second axis 310, with the first axis 308 parallel to the second axis 310, and with both of the first axis 308 and second axis 310 positioned perpendicular with the horizontal centerline 205 of the combustion chamber 201 (shown by FIG. 2A). Each of the first axis 308 and the second axis 310 are positioned between the first squish region 224 and the second squish region 226, such that the intake valve 300, exhaust valve 238, fuel injector 304, and second spark plug 222 are also positioned between the first squish region 224 and the second squish region 226.

In the example shown by FIG. 3, the first squish region 224 includes curved surfaces 303 while the second squish region 226 includes curved surface 305. The curved surfaces 303 are shaped such that the first squish region 224 curves away from the intake valve 300 and exhaust valve 238. Similarly, the curved surface 305 is shaped such that the second squish region 226 curves away from both of the fuel injector 304 and the second spark plug 222.

As described above with reference to FIGS. 2A-2B, the embodiment shown by FIGS. 2A-6 includes pre-chamber 216 formed by the cylinder head 202 and positioned within the first squish region 224. In alternate embodiments, the pre-chamber may instead be positioned in a different location, such as a midpoint of the top surface 240 of the combustion chamber 201 shown by FIGS. 2A-2B (e.g., a location along the top surface 240 that is vertically in-line with an intersection of first axis 308 and horizontal centerline 205). In such alternate embodiments, the pre-chamber extends from the top surface 240 away from the cylinder head 202 and into the combustion chamber 201. In other words, the pre-chamber is positioned such that the sidewall 218 of the pre-chamber is located within the combustion chamber and not within the cylinder head 202 (e.g., the pre-chamber 216 extends vertically below the intake valve 300 and exhaust valve 238).

As shown by FIG. 3, the pre-chamber 216 is positioned such that a midpoint 307 of the pre-chamber 216 is in-line with horizontal centerline 205. The pre-chamber 216 has a diameter 306 and is separated from the combustion chamber by sidewall 218. Sidewall 218 includes the plurality of orifices 236 positioned such that combusted materials 232 spray from the pre-chamber 216 in directions away from the sidewall 218 and pre-chamber 216 when the protrusion 212 of the piston 204 (as shown by FIGS. 2A-2B) is pressed into the pre-chamber 216. In this way, combusted materials 232 spraying from the pre-chamber 216 may mix with uncombusted gas (e.g., air or an air/fuel mixture) within the combustion chamber 201 shown by FIGS. 2A-2B in order to ignite the uncombusted gas. In one example, as shown by FIG. 5 and described below, the plurality of orifices 236 may be shaped and positioned in order to increase an amount of mixing of the combusted materials 232 with the uncombusted gas of the combustion chamber. Additionally, the protrusion 212 and piston 204 may be shaped to increase an amount of combusted materials 232 spraying from the pre-chamber 216 and through the orifices 236, as described below with reference to FIG. 4.

FIG. 4 shows a view of the piston 204 described above with reference to FIGS. 2A-3 in a view from vertically above the piston 204 (e.g., as viewed from within the combustion chamber 201). The protrusion 212 is shown positioned in-line with the horizontal centerline 205 by FIG. 4. Additionally, as shown and described above with reference to FIGS. 2A-2B, the protrusion 212 is vertically in-line with the pre-chamber 216. In other words, the protrusion 212 of the piston 204 and the pre-chamber 216 are each positioned along vertical axis 242 (shown by FIG. 2A).

The protrusion 212 has a diameter 406 that may be slightly less than the diameter 306 (shown by FIG. 3) of the pre-chamber 216. Additionally, in one example as shown by FIG. 6 and described below, the protrusion 212 may extend from the piston crown 206 by an amount less than a depth of the pre-chamber 216. In this way, when the piston 204 moves from the BDC position (shown by FIG. 2A) to the TDC position (shown by FIG. 2B), the protrusion 212 fits within the pre-chamber 216.

A perspective view of the pre-chamber 216 is shown by FIG. 5. As described above with reference to FIGS. 2A-3, the pre-chamber 216 may be formed by the first squish region 224 with the plurality of orifices 236 formed by sidewall 218. In the example shown by FIG. 5, the pre-chamber 216 includes five orifices (e.g., first orifice 500, second orifice 502, third orifice 504, fourth orifice 506, and fifth orifice 508). Each of the orifices are positioned along a perimeter of the sidewall 218 such that combusted materials within the pre-chamber 216 (as described above with reference to FIGS. 2A-3) may spray outward from the pre-chamber 216 and away from the sidewall 218.

In one example, such as the example shown by FIG. 5, a midpoint of each orifice may be positioned a same distance from a midpoint of each adjacent orifice. In other words, the orifices 236 may positioned along the perimeter of the sidewall 218 such that an angle between adjacent orifices is the same. For example, the first orifice 500 is shown with first jet 501, the second orifice 502 is shown with second jet 503, the third orifice 504 is shown with third jet 505, the fourth orifice 506 is shown with fourth jet 507, and the fifth orifice 508 is shown with fifth jet 509. The second jet 503 is angled relative to the third jet 505 by a first angle 510, and the third jet 505 is angled relative to the fourth jet 507 by a second angle 512. In the example shown by FIG. 5, the first angle 510 and the second angle 512 are a same amount of angle. Similarly, the first jet 501 is angled relative to the second jet 503 by the same amount of angle, and the fourth jet 507 is angled relative to the fifth jet 509 by the same amount of angle. By arranging the orifices 236 in this way, an amount of mixing of combusted materials (as described above) from the pre-chamber 216 with uncombusted gas within the combustion chamber may be increased. In alternate embodiments, the sidewall may include a different number of orifices and/or one or more of the orifices may be positioned differently along the sidewall 218 than the arrangement shown by FIG. 5. For example, in embodiments in which the pre-chamber is located at a midpoint of the top surface 240 (shown by FIGS. 2A-3), the orifices may instead be positioned at various locations along an entire circumference of the sidewall.

The diameter of each orifice may be different than a diameter of at least one other orifice. In the example shown by FIG. 5, the first orifice 500 has a first diameter 514, the second orifice 502 has a second diameter 516, the third orifice 504 has a third diameter 518, the fourth orifice 506 has a fourth diameter 520, and the fifth orifice 508 has a fifth diameter 522. In this example, the first diameter 514 is a same amount of length as the fifth diameter 522, and the second diameter 516 is a same amount of length as the fourth diameter 520, with the second diameter 516 and the fourth diameter 520 each being greater than the first diameter 514, the fifth diameter 522, and the third diameter 518. Additionally, the third diameter 518 is greater than each of the first diameter 514 and the fifth diameter 522.

By configuring the orifices with these diameters, the second jet 503 and fourth jet 507 may include a larger amount of combusted material from the pre-chamber 216 than the first jet 501, third jet 505, and fifth jet 509, while the third jet 505 may include a larger amount of combusted material than the first jet 501 and fifth jet 509. In other words, a length of the second jet 503 and fourth jet 507 (for example) may be longer than a length of the first jet 501, third jet 505, and fifth jet 509. In this way, each orifice may be sized according to a distance of each orifice from walls of the combustion chamber. For example, third orifice 504 may be a smaller amount of distance from second squish region 226 (shown by FIGS. 2A-3) than either of the second orifice 502 and the fourth orifice 506. As a result, the diameter of the third orifice 504 (e.g., third diameter 518) is decreased relative to the diameter of the second orifice 502 and fourth orifice 506 (e.g., second diameter 516 and fourth diameter 520, respectively) so that the third jet 505 has a smaller length than the second jet 503 and fourth jet 507. In alternate embodiments, each orifice may have a same diameter. In other embodiments, one or more orifices may have a different diameter than the diameters shown by FIG. 5. For example, in embodiments including a second squish region with a different amount of curvature, the diameters of the orifices may be configured such that a length of each jet corresponds to a distance of a corresponding orifice from the second squish region.

FIG. 6 shows a perspective view of the pre-chamber ignition system 290 including the combustion chamber 201 formed by the cylinder 200 and cylinder head 202. In the view shown by FIG. 6, the piston 204 is in the BDC position as described above with reference to FIGS. 2A-2B. In this position, a first length 600 of the pre-chamber 216 is shown. The first length 600 is a length of the pre-chamber 216 in a direction parallel to the central axis 203 from a bottom surface 601 of the first squish region 224 to a top surface 603 of the pre-chamber 216. In the example shown by FIG. 6, the top surface 603 of the pre-chamber 216 is parallel and in-line with the top surface 240 of the combustion chamber 201. In alternate examples, the top surface 603 of the pre-chamber 216 may be angled relative to the top surface 240 of the combustion chamber 201 and/or may be positioned vertically below the top surface 240. In each alternate embodiment, the top surface 603 of the pre-chamber 216 is not positioned vertically above the top surface 240 of the combustion chamber 201. Additionally, in alternate embodiments, a shape of the protrusion 212 of the piston 204 may be shaped differently such that an angle of a top surface 604 of the protrusion 212 relative to the crown 206 of the piston 204 matches the angle of the top surface 603 of the pre-chamber 216 relative to the top surface 240 of the combustion chamber 201.

A second length 602 of the protrusion 212 of the piston 204 is also shown, with the second length 602 being less than the first length 600 of the pre-chamber 216. By configuring the second length 602 to be less than the first length 600, the protrusion 212 may fit within the pre-chamber 216 when the piston 204 is moved into the TDC position (shown by FIG. 2B). As the protrusion 212 is pressed into the pre-chamber 216, gases (e.g., air or an air/fuel mixture)

within the pre-chamber 216 may be compressed to a higher pressure than gases within the combustion chamber 201, thereby increasing a temperature of gases within the pre-chamber 216 relative to gases within the combustion chamber 201. In this way, the pre-chamber 216 may increase a combustibility of the gases in response to a spark from the first spark tip 220 (shown by FIGS. 2A-2B) disposed within the pre-chamber 216, as described below with reference to FIGS. 7-8.

FIG. 7 illustrates an example method for combusting an air/fuel mixture within a combustion chamber including a pre-chamber and a piston with a protrusion shaped to fit within the pre-chamber, such as the protrusion 212, piston 204, pre-chamber 216, and combustion chamber 201 described above with reference to FIGS. 2A-6. In the example method described below, the pre-chamber extends away from a top surface (e.g., top surface 240 shown by FIGS. 2A-3 and FIG. 6) of the combustion chamber formed by a cylinder head (e.g., cylinder head 202 shown by FIGS. 2A-3 and FIG. 6) and toward a bottom-dead-center position of the piston. The pre-chamber includes a bottom aperture (e.g., bottom aperture 207 shown by FIG. 2A and FIG. 6) shaped to receive the piston protrusion, and a plurality of orifices formed by a sidewall (e.g., orifices 236 formed by sidewall 218, shown by FIGS. 2A-3 and FIGS. 5-6) configured to spray combusted materials (e.g., partially combusted fuel/air mixture) from the pre-chamber and into the combustion chamber (which may herein be referred to as a main chamber).

In one example, method 700 shown by FIG. 7 includes steps for adjusting a spark timing of a spark plug disposed within the pre-chamber (such as first spark plug 228 shown by FIGS. 2A-2B). The steps for adjusting spark timing of the first spark plug (which may be referred to herein as a pre-chamber spark plug) are shown by FIG. 8.

In another example, method 700 shown by FIG. 7 includes steps for adjusting a spark timing of a spark plug disposed within the main chamber (such as second spark plug 230 shown by FIGS. 2A-3 and FIG. 6). The steps for adjusting spark timing of the second spark plug (which may be referred to herein as a secondary spark plug) are shown by FIG. 9.

Figure 8:
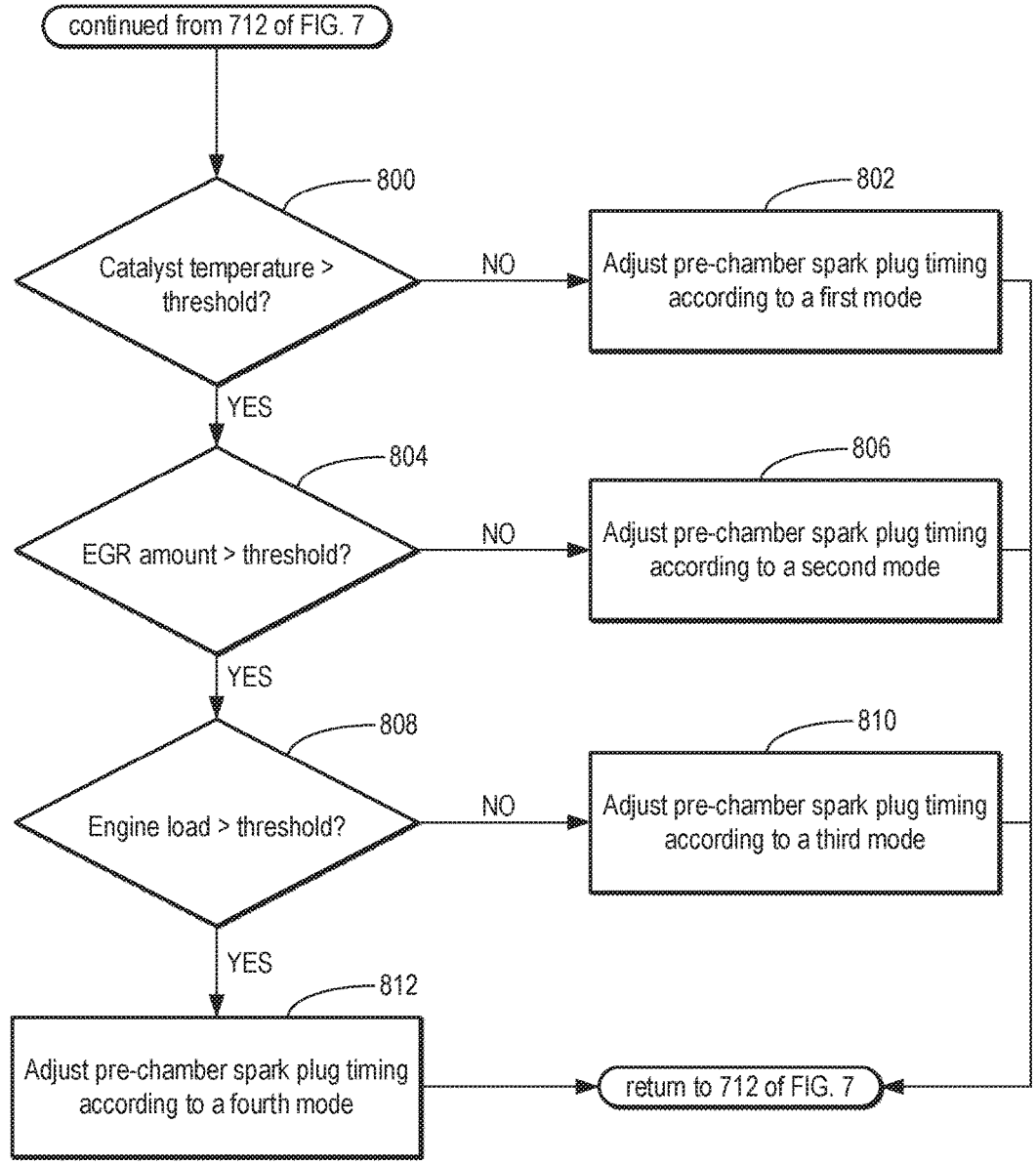
FIG. 8 illustrates steps for adjusting a spark timing of a spark plug disposed within the pre-chamber in response to engine operating conditions.
Figure 9:
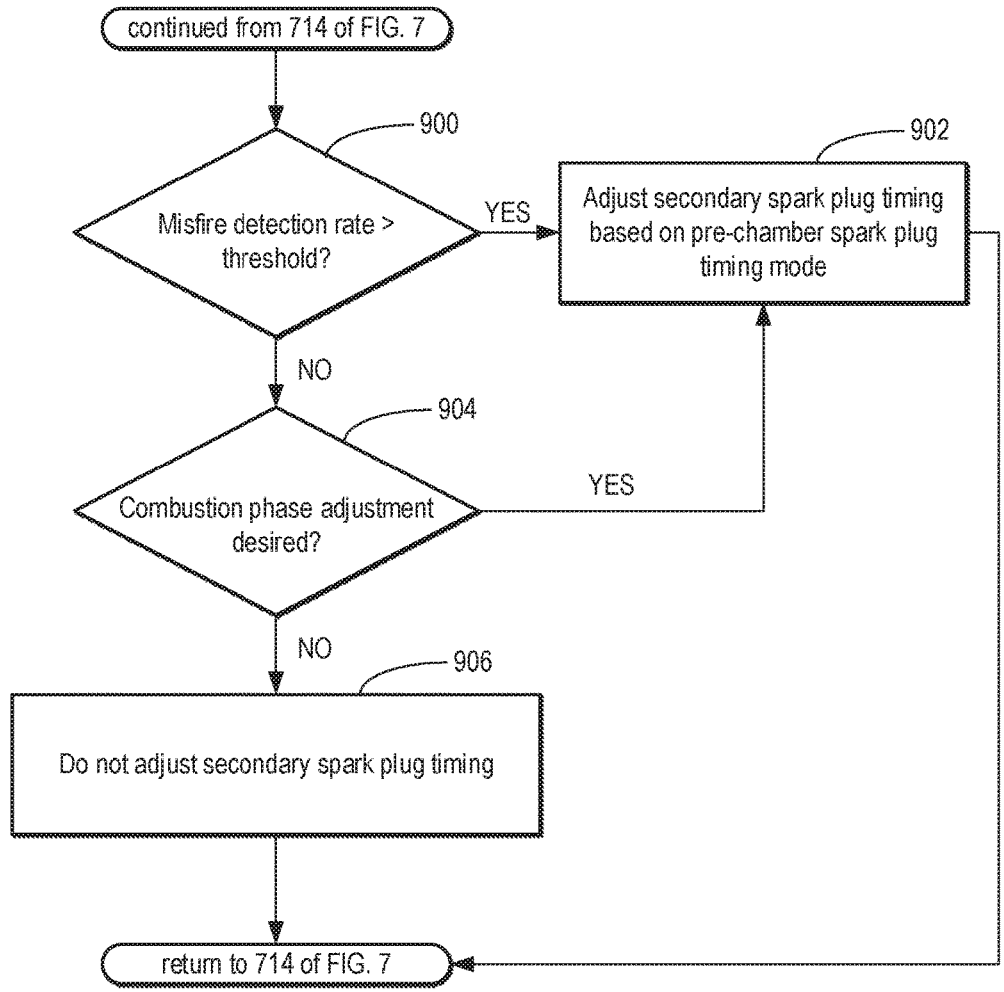
FIG. 9 illustrates steps for adjusting a spark timing of a spark plug disposed within the main combustion chamber in response to engine operating conditions.

In some embodiments (such as embodiments including the secondary spark plug), the method may include the steps shown by both of FIG. 8 and FIG. 9, or may include the steps shown by only one of FIG. 8 or FIG. 9. In other embodiments (e.g., embodiments which do not include either of the pre-chamber spark plug and the secondary spark plug, such as a combustion chamber of a diesel engine), the steps shown by FIG. 8 and FIG. 9 may be omitted from method 700. In yet alternate embodiments, the method 700 may include the steps shown by FIG. 8 and/or FIG. 9 in a single combustion cycle, and may not include the steps shown by FIG. 8 and FIG. 9 in a combustion cycle immediately following the single combustion cycle. Alternate embodiments including combinations of the conditions described above are also possible.

Instructions for carrying out method 700 and the rest of the methods included herein may be executed by a controller (such as the controller 169 shown by FIG. 1 and described above) based on instructions stored on a memory of the controller and in conjunction with signals received from sensors of the engine system, such as the sensors described above with reference to FIG. 1. The controller may employ engine actuators of the engine system to adjust engine operation, according to the methods described below.

Method 700 includes estimating and/or measuring engine operating conditions at 702 based on one or more outputs of various sensors in the engine system and/or operating conditions of the engine system (e.g., such as various temperature sensors, pressure sensors, etc., as described above with reference to FIG. 1). Engine operating conditions may include engine speed and load, spark plug timing, rate of engine misfires, rate of engine load increase, fuel pressure, pedal position, fuel injector nozzle opening times, mass air flow rate, turbine speed, compressor inlet pressure, emission control device temperature, crankshaft position, etc.

The method continues to 704 where the method includes flowing intake air and/or an air and fuel mixture into the combustion chamber. In one example, air may flow into the combustion chamber through one or more intake valves (e.g., intake valve 300 shown by FIG. 3 and FIG. 6). In another example, air may be mixed with fuel at a location upstream of the combustion chamber (e.g., intake port 106 shown by FIG. 1) and the air/fuel mixture may flow into the combustion chamber via one or more intake valves coupled with the cylinder head.

Thus, in one example, the method at 704 may include actuating an actuator of one or more intake valves to open the intake valves and flow air into the combustion chamber. In one example, the intake valves may be actuated by one or more electromechanical actuators (e.g., a solenoid), and an amount of opening of each intake valve and/or duration of opening of each intake valve may be adjusted by adjusting electrical signals transmitted to the electromechanical actuators by the controller. For example, increasing a duration of an electrical signal transmitted to an electromechanical actuator of an intake valve may increase an opening duration of the intake valve, while increasing an amplitude of an electrical signal transmitted to the electromechanical actuator of the intake valve may increase an amount of opening of the intake valve. In another example, the one or more intake valves may be mechanically actuated by a camshaft, and an actuation timing of the valves by the camshaft may be adjusted by the controller. For example, the controller may transmit an electrical signal to an actuator of the camshaft in order to adjust a position of the camshaft and/or one or more cams of the camshaft in relation to the intake valves in order to adjust an actuation timing of the intake valves.

The method optionally continues from 704 to 706 where the method includes injecting fuel into the combustion chamber via one or more fuel injectors (e.g., fuel injector 304 shown by FIG. 3 and FIG. 6). For example, if air flows into the combustion chamber at 704 instead of the air/fuel mixture, at 706 the controller may actuate one or more fuel injectors disposed within the combustion chamber to inject fuel into the combustion chamber in order to mix the air with the injected fuel. In some examples, the amount of fuel injected may be based on an amount of air flowing into the combustion chamber and/or other engine operating conditions (e.g., engine torque demand). For example, during boosted conditions (e.g., during conditions in which compressed intake air is delivered to the combustion chamber via a compressor, such as compressor 184 shown by FIG. 1), the controller may increase an opening time of a nozzle of one or more fuel injectors in order to increase an amount of fuel injected into the combustion chamber in response to the increased amount of intake air flowing into the combustion chamber. In one example, the amount of opening time of the nozzles may be adjusted by increasing or decreasing a duration of an electrical signal transmitted to the fuel injectors by the controller. In this way, a stoichiometric mixture of fuel and air may be provided to the combustion chamber in order to increase an amount of combustion within the combustion chamber.

The method continues from 704 (if the air/fuel mixture flows into the combustion chamber) or from 706 (if the air is mixed with injected fuel within the combustion chamber) to 708 where the method includes moving the piston and the piston protrusion toward the pre-chamber. The protrusion of the piston is formed as an extension of the piston and is permanently affixed to a crown of the piston (e.g., crown 206 shown by FIG. 1). As a result, the piston and the protrusion move together toward the pre-chamber. In one example, the piston and protrusion may move from a bottom-dead-center (BDC) position (shown by FIG. 2A and FIG. 6) toward a top-dead-center (TDC) position (shown by FIG. 2B). The BDC position of the piston corresponds to a bottommost position of the piston relative to the cylinder head. In the BDC position, the protrusion of the piston is not inserted within the pre-chamber. As the piston and protrusion move toward the pre-chamber, the fuel and air mixture within the pre-chamber is compressed and a pressure of the mixture increases. In one example, as the protrusion of the piston enters the bottom aperture of the pre-chamber, the pressure of the mixture within the pre-chamber may be greater than a pressure of the mixture in the main chamber. As a result, a temperature of the mixture within the pre-chamber may be greater than a temperature of the mixture in the main chamber.

The method continues to 710 where the method includes initiating spark and adjusting spark timing based on engine operating conditions. For example, spark may be initiated by the controller by actuating one or more spark plugs disposed within the pre-chamber and/or main chamber (such as the pre-chamber spark plug or secondary spark plug). In one example, adjusting spark timing includes adjusting pre-chamber spark timing of a spark plug disposed in the pre-chamber at 712 based on engine operating conditions. In another example, adjusting spark timing includes adjusting main chamber spark timing of a spark plug disposed in the main combustion chamber (and not the pre-chamber) at 714 based on engine operating conditions. Steps to adjust pre-chamber spark timing at 712 are shown by FIG. 8 and described further below. Steps to adjust main chamber spark timing at 714 are shown by FIG. 9 and described further below. Additional examples may include both of the adjustments shown at 712 and 714 (e.g., steps shown by both of FIG. 8 and FIG. 9).

The method continues to 716 where the method includes pressing the piston protrusion into the pre-chamber to drive the partially combusted air/fuel mixture through pre-chamber orifices and into the main chamber. For example, after spark is initiated at 710 and within the same combustion cycle, the mixture within the pre-chamber may partially combust, thereby increasing a temperature and pressure of the mixture within the pre-chamber. Additionally, as the piston and protrusion continue to move in the direction of the pre-chamber (e.g., in the direction of the top of the combustion chamber) as described above with reference to 708, the protrusion presses into the pre-chamber and decreases an available volume of the pre-chamber for combustion of the mixture. As the available volume decreases (e.g., as the protrusion is pressed into the pre-chamber), the pressure of the mixture further increases and the partially combusted mixture is driven out of the orifices of the pre-chamber and into the main chamber.

The method continues to 718 where the method includes combusting air/fuel within the main chamber via the partially combusted air/fuel mixture from the pre-chamber. As a result of the partially combusted mixture being driven through the orifices of the pre-chamber and into the main chamber at 716, the partially combusted mixture may mix with the air/fuel mixture within the main chamber. In this way, the partially combusted mixture driven from the orifices of the pre-chamber may rapidly heat the uncombusted air/fuel mixture within the main chamber in order to ignite the uncombusted mixture within the main chamber.

By igniting the uncombusted air/fuel mixture within the main chamber with the partially combusted mixture driven from the orifices of the pre-chamber, a combustibility of the mixture within the main chamber may be increased. For example, during engine conditions in which a ratio of EGR gases to fresh intake air within the combustion chamber and pre-chamber is high (e.g., when fresh intake air is mixed with EGR gases upstream of the combustion chamber, or when fresh intake air is mixed with residual exhaust gases from combustion within the combustion chamber), a combustion temperature of the intake air/fuel mixture (e.g., a temperature at which the mixture may combust) may be increased relative to a combustion temperature of an air/fuel mixture that does not include EGR gases. By increasing the temperature and pressure of the air/fuel mixture within the pre-chamber as described above, the mixture may reach combustion temperature more easily, thereby increasing a combustibility of the mixture. As a result, an increased amount of EGR gases may be utilized during the combustion cycle, thereby increasing emissions performance and fuel efficiency.

FIG. 8 shows a continuation of step 710 shown by method 700 of FIG. 7. Specifically, FIG. 8 shows steps included by secondary step 712 for adjusting pre-chamber spark timing based on engine operating conditions. The controller may transmit electrical signals to the pre-chamber spark plug in order to actuate the pre-chamber spark plug and produce a spark at a tip of the pre-chamber spark plug. In one example, adjusting pre-chamber spark timing may include adjusting an amount of time between electrical signals (e.g., adjusting a transmission rate of electrical signals) transmitted from the controller to the pre-chamber spark plug, adjusting a duration and/or number of the electrical signals transmitted to the pre-chamber spark plug from the controller, and/or adjusting a time at which the spark is produced at the tip of the pre-chamber spark plug (e.g., a time at which spark is initiated) relative to the combustion cycle.

The method continues from 712 (shown by FIG. 7) to 800 (shown by FIG. 8) where the method includes determining whether a catalyst temperature is greater than a threshold temperature. For example, catalyst temperature may be a sensed and/or estimated temperature of an emission control device, such as emission control device 190 shown by FIG. 1. In one example, the threshold temperature may be a normal operating temperature (or light-off temperature) of the emission control device during periods of prolonged engine operation (e.g., when the engine is not in a cold start condition). In other words, the threshold temperature may be a temperature at which the emission control device effectively removes NOx and other noxious substances from engine exhaust gases. The controller may compare the sensed and/or estimated temperature of the emission control device to the threshold temperature in order to determine whether the sensed and/or estimated temperature is greater than the threshold temperature.

If the catalyst temperature is not greater than the threshold temperature at 800, the method continues to 802 where the method includes adjusting pre-chamber spark plug timing according to a first mode. In the first mode, spark timing of the pre-chamber spark plug is delayed in order to increase a temperature of the emissions control device. For example, the first mode includes actuating the pre-chamber spark plug via the controller in order to produce a spark while the protrusion is moving in a direction away from the cylinder head during a single combustion cycle, after the protrusion has been fully inserted into the pre-chamber and before the protrusion has been fully removed from the pre-chamber during the single combustion cycle. In other words, the controller may send an electrical signal to the pre-chamber spark plug in order to produce a spark at a tip of the pre-chamber spark plug as the piston moves from the TDC position (shown by FIG. 2B and described above) of a compression stroke of the single combustion cycle and toward the BDC position (shown by FIG. 2A and described above) of a power stroke of the single combustion cycle, while the protrusion of the piston is still partially within the pre-chamber during the single combustion cycle.

By timing the actuation of the pre-chamber spark plug in this way, a temperature of exhaust gases flowing from the combustion chamber during an exhaust stroke of the single combustion cycle may be increased. For example, as the protrusion of the piston moves within the pre-chamber and away from the cylinder head, a pressure of air/fuel within the pre-chamber may decrease (e.g., a vacuum effect may develop), thereby increasing a flow of air/fuel mixture from the combustion chamber into the pre-chamber via the orifices of the pre-chamber. The spark produced by the pre-chamber spark plug ignites the air/fuel mixture flowing into the pre-chamber. As the protrusion is removed from the pre-chamber, partially combusted air/fuel from the pre-chamber may flow out of the bottom aperture and into the combustion chamber, thereby igniting the remaining air/fuel mixture within the combustion chamber. As a result, a relatively late combustion of air/fuel within the combustion chamber occurs, and an increased amount of thermal energy resulting from the combustion may be retained by the exhaust gases flowing out of the combustion chamber during the exhaust stroke. The increased thermal energy of the exhaust gases may subsequently increase a heating rate of the emissions control device, thereby bringing the emissions control device to a normal operating temperature in a smaller amount of time during conditions such as an engine cold start (e.g., a condition in which the engine is turned on and operating after a prolonged period of being turned off and not operating). The method then continues from 802 by returning to 710 shown by FIG. 7.

If the catalyst temperature is greater than the threshold temperature at 800, the method continues to 804 where the method includes determining whether an EGR amount is greater than a threshold amount. The EGR amount corresponds to an amount of EGR gases within the combustion chamber. In one example, EGR gases may be mixed with fresh intake air at a location (e.g., an intake passage) upstream of the combustion chamber. In another example, EGR gases may be residual combustion gases within the combustion chamber from a previous combustion cycle. The controller may measure and/or estimate the amount of EGR gases within the combustion chamber via one or more sensors and/or engine operating conditions in order to compare the measured and/or estimated amount with the threshold amount. In one example, the threshold amount corresponds to an amount of EGR gases at which combustion stability may be affected. For example, an amount of EGR gases above the threshold amount within the combustion chamber may decrease a combustibility of an air/fuel mixture within the combustion chamber. As a result, a combustion temperature (e.g., a temperature at which combustion occurs) of the air/fuel mixture may be increased. In one example, in order to combust the air/fuel mixture in the presence of a high amount of EGR gases, the temperature of the air/fuel mixture may be increased within the pre-chamber, as described below with reference to 810.

If the amount of EGR gases within the combustion chamber is less than the threshold amount at 804, the method continues to 806 where the method includes adjusting pre-chamber spark plug timing according to a second mode. In the second mode, spark timing of the pre-chamber spark plug is adjusted such that combustion within the pre-chamber is initiated prior to the protrusion of the piston pressing fully into the pre-chamber. For example, the second mode includes actuating the pre-chamber spark plug via the controller in order to produce a spark while the protrusion is moving in a direction toward the cylinder head during a single combustion cycle, before the protrusion has been partially inserted into the pre-chamber during the single combustion cycle. In other words, a spark is produced by the pre-chamber spark plug as the piston moves from the BDC position of a compression stroke of the single combustion cycle and toward the TDC position of the compression stroke of the single combustion cycle, before the protrusion of the piston is partially inserted within the pre-chamber during the single combustion cycle. In one example, the spark may be produced immediately prior to the protrusion pressing into the pre-chamber during the compression stroke of the single combustion cycle.

By timing the actuation of the pre-chamber spark plug in this way, combustion of fuel/air mixture within the pre-chamber may initiate prior to the protrusion pressing into the pre-chamber. In other words, combustion within the pre-chamber may be initiated early relative to a combustion occurring when the protrusion is fully inserted into the pre-chamber. Initiating an early combustion within the pre-chamber increases a temperature of air/fuel within the pre-chamber prior to the protrusion pressing into the pre-chamber. The protrusion may then press into the pre-chamber (as described above with reference to 716 shown by FIG. 7) and spray the partially combusted air/fuel through the orifices of the pre-chamber and into the combustion chamber (as described above with reference to 718 shown by FIG. 7), thereby igniting the air/fuel mixture within the combustion chamber. The method then continues from 806 by returning to 710 shown by FIG. 7.

If the amount of EGR gases within the combustion chamber is greater than the threshold amount at 804, the method continues to 808 where the method includes determining whether a measured and/or estimated engine load is greater than a threshold engine load. For example, engine load may be measured and/or estimated by the controller based on one or more sensors (e.g., engine speed sensor, crankshaft position sensor, etc.) or inferred based on engine operating conditions (e.g., exhaust flow rate, fuel consumption, etc.). In one example, the threshold engine load may correspond to an engine load at which a single combustion cycle occurs within a particular amount of time. For example, when the engine is in a condition of high load, a single combustion cycle may occur within a first amount of time, and when the engine is in a condition of low load, a single combustion cycle may occur within a second amount of time, with the second amount of time being a greater than the first amount of time.

If the measured and/or estimated engine load is less than the threshold engine load at 808, the method continues to

810 where the method includes adjusting pre-chamber spark plug timing according to a third mode. In the third mode, spark timing of the pre-chamber spark plug is adjusted such that combustion within the pre-chamber is initiated as the protrusion of the piston is fully pressed into the pre-chamber. For example, the third mode includes actuating the pre-chamber spark plug via the controller in order to produce a spark while the protrusion is moving in a direction toward the cylinder head during a single combustion cycle and after the protrusion has been partially inserted into the pre-chamber during the single combustion cycle. In other words, a spark is produced by the pre-chamber spark plug as the piston moves away from the BDC position of a compression stroke of the single combustion cycle and toward the TDC position of the compression stroke of the single combustion cycle, while the protrusion of the piston is partially inserted within the pre-chamber during the single combustion cycle. The method then continues from 810 by returning to 710 shown by FIG. 7.

If the measured and/or estimated engine load is greater than the threshold engine load at 808, the method continues to 812 where the method includes adjusting pre-chamber spark plug timing according to a fourth mode. In the fourth mode, spark timing of the pre-chamber spark plug is adjusted such that combustion within the pre-chamber is initiated prior to the protrusion of the piston pressing fully into the pre-chamber by a plurality of sparks and/or sparks of a longer duration. For example, similar to the second mode described above, the fourth mode includes actuating the pre-chamber spark plug via the controller in order to produce a spark while the protrusion is moving in a direction toward the cylinder head during a single combustion cycle, before the protrusion has been partially inserted into the pre-chamber during the single combustion cycle. However, in contrast with the second mode, the fourth mode includes actuating the pre-chamber spark plug by an increased number of times and/or actuating the pre-chamber spark plug for an increased duration relative to the actuation described above with reference to the second mode.

Engine conditions while the pre-chamber spark timing is in the fourth mode include the emissions control device temperature being less than the threshold temperature, an amount of EGR gases within the combustion chamber and pre-chamber being greater than the threshold amount, and engine load being greater than the threshold load. As a result of these engine conditions, combustibility of the air/fuel mixture within the combustion chamber and pre-chamber may be low (e.g., due to the high amount of EGR gases), and an amount of time to combust the mixture may be increased. However, due to the high engine load, the amount of time in which a single combustion cycle occurs may be low, as described above. Due to the increased amount of time to combust the mixture and the decreased amount of time in a single combustion cycle, a likelihood of combustion instability (e.g., partial/incomplete combustion) may increase. In order to reduce the likelihood of combustion instability, the fourth mode may result in the pre-chamber spark plug producing sparks of a longer duration and/or an increased number of sparks in order to increase a likelihood of partial combustion of air/fuel mixture within the pre-chamber. The partially combusted mixture is then driven out of the orifices of the pre-chamber (as described above with reference to 716 shown by FIG. 7) in order to combust the air/fuel mixture within the main chamber (as described above with reference to 718 shown by FIG. 7). The method then continues from 812 by returning to 710 shown by FIG. 7.

FIG. 9 shows another example continuation of 710 shown by method 700 of FIG. 7. Specifically, FIG. 9 shows steps included by 714 for adjusting main chamber spark timing based on engine operating conditions. The controller may transmit electrical signals to a secondary spark plug disposed within the main chamber (such as second spark plug 222 shown by FIGS. 2A-2B, FIG. 3, and FIG. 6) in order to actuate the secondary spark plug and produce a spark at a tip of the secondary spark plug. In one example, adjusting main chamber spark timing (which may be referred to herein as secondary spark timing) may include adjusting an amount of time between electrical signals (e.g., adjusting a transmission rate of electrical signals) transmitted from the controller to the secondary spark plug, adjusting a duration and/or number of the electrical signals transmitted to the secondary spark plug from the controller, and/or adjusting a time at which the spark is produced at the tip of the secondary spark plug (e.g., a time at which spark is initiated) relative to the combustion cycle.

The method continues from 714 shown by FIGS. 7 to 900 shown by FIG. 9 where the method includes determining whether a misfire detection rate is greater than a threshold rate. For example, combustion chamber misfires may be detected by the controller via one or more sensors and/or may be estimated based on engine operating conditions (e.g., fluctuations in torque output, etc.). In one example, the threshold rate may be based on a rate at which engine torque output is degraded. In another example, the threshold rate may be based on a rate at which an emissions performance of the engine is degraded (e.g., a rate at which noxious emissions are increased). In one example, the misfire detection rate may be a number of combustion chamber misfires occurring during a pre-determined amount of time of engine operation (e.g., a number of misfires occurring over a set duration of engine operation). In another example, the misfire detection rate may be a number of combustion chamber misfires detected over a set number of combustion cycles. The controller may record a number of misfires detected over the set number of combustion cycles to determine the rate of misfires per set number of combustion cycles. The controller may then compare the rate of misfires to the threshold rate. The misfire detection rate may be determined by the controller for a single combustion chamber, or may be a combined rate for a plurality of combustion chambers.

If the misfire detection rate is determined to be greater than the threshold rate at 900, the method continues to 902 where the method includes adjusting secondary spark plug timing based on the pre-chamber spark plug timing mode. For example, if the pre-chamber spark plug timing is in the first mode, the secondary spark plug timing (e.g., a timing of the spark plug disposed within the main chamber, such as second spark plug 222 shown by FIGS. 2A-2B, FIG. 3, and FIG. 6) may be adjusted such that the secondary spark plug has a same timing as the pre-chamber spark plug. In other words, the controller may actuate the secondary spark plug at a same time as the pre-chamber spark plug in order to partially combust the air/fuel mixture within the main chamber while the pre-chamber spark plug partially combusts the air/fuel mixture within the pre-chamber. In this way, a likelihood of misfire may be decreased. As another example, if the pre-chamber spark plug timing is in the second mode or fourth mode, the secondary spark plug timing may be adjusted such that the secondary spark plug is actuated immediately following the actuation of the pre-chamber spark plug in order to increase combustion stability. As yet another example, if the pre-chamber spark plug timing is in the third mode, the secondary spark plug timing may be adjusted such that the secondary spark plug is actuated while partially combusted air/fuel from the pre-chamber is driven into the combustion chamber in order to reduce a likelihood of incomplete combustion.

The method then continues from 902 by returning to 710 shown by FIG. 7.

If the misfire detection rate is determined to be less than the threshold rate at 900, the method continues to 904 where the method includes determining whether a combustion phase adjustment is desired. For example, when the pre-chamber spark plug is actuated according to the first mode, combustion within the main chamber may occur relatively late compared to conditions in which the pre-chamber spark plug is actuated according to the second, third, or fourth modes. In this condition, the controller may make a determination to adjust combustion phasing, as described below.

If a combustion phase adjustment is desired at 904, the method continues to 902 where the method includes adjusting secondary spark plug timing based on pre-chamber spark plug timing mode, as described above. In one example, as the temperature of the emissions control device approaches the threshold temperature as described above with reference to 800 shown by FIG. 8, the secondary spark plug timing may be adjusted in order to actuate the secondary spark plug earlier in the combustion cycle, thereby resulting in an earlier combustion within the main chamber. By causing the combustion within the main chamber to occur earlier, a reduced amount of thermal energy may be directed to the emissions control device via the exhaust gases as described above with reference to 802 shown by FIG. 8. In this way, as the temperature of the emissions control device approaches the threshold temperature, a decreased amount of energy may be utilized to warm the emissions control device and instead the energy may be utilized to increase a torque output of the engine (e.g., by applying a greater amount of force to the piston via combustion). The method then continues from 902 by returning to 710 shown by FIG. 7.

If a combustion phase adjust is not desired at 904, the method continues to 906 where the method includes not adjusting secondary spark plug timing. For example, if the secondary spark plug is actuated with a particular timing, no adjustment to that timing is performed by the controller. The method then continues from 902 by returning to 710 shown by FIG. 7.

By adjusting pre-chamber spark plug timing and main chamber spark plug timing in response to engine operation conditions according to the methods described above, a likelihood of misfires may be reduced. Additionally, during conditions in which a ratio of EGR gases to fresh intake air within the combustion chamber is high, a combustibility of the mixture may be increased.

The technical effect of pressing a protrusion of a piston into a pre-chamber disposed within a combustion chamber is to increase a temperature and pressure of an air/fuel mixture within the pre-chamber. The technical effect of adjusting a pre-chamber spark plug timing in response to engine operating conditions is to adjust a combustion timing of the combustion chamber. In this way, by increasing the temperature and pressure of the air/fuel mixture within the pre-chamber, the air/fuel mixture may be partially combusted in order to ignite an air/fuel mixture within the combustion chamber. The partially combusted air/fuel mixture within the pre-chamber may increase a combustibility of the air/fuel mixture within the combustion chamber. Additionally, by positioning the orifices of the pre-chamber within a sidewall of the pre-chamber disposed within the combustion chamber, jets of partially combusted air/fuel may spray from the orifices and increase a mixing of the partially combusted mixture with the uncombusted mixture. Additionally, by pressing the protrusion of the piston through the bottom aperture of the pre-chamber, an increased amount of combusted gases may flow out from the bottom aperture as the protrusion moves away from the cylinder head, thereby decreasing an amount of fresh air dilution by exhaust gases during the next combustion cycle.

FIGS. 2A-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In one embodiment, a system includes: a combustion chamber formed by a cylinder capped by a cylinder head; a pre-chamber formed by the cylinder head, the pre-chamber extending away from the cylinder head and into the cylinder; and a piston disposed within the cylinder, the piston including a protrusion shaped to fit within the pre-chamber. In a first example of the system, the system includes a first spark plug coupled with the cylinder head at a first location, wherein a tip of the first spark plug is disposed within the pre-chamber. A second example of the system optionally includes the first example, and further includes a second spark plug coupled with the cylinder head at a second location, and wherein a tip of the second spark plug is disposed within the combustion chamber at a second location external to the pre-chamber. A third example of the system optionally includes one or both of the first and second examples, and further includes wherein the pre-chamber includes a plurality of orifices formed by a sidewall of the pre-chamber. A fourth example of the system optionally includes one or more or each of the first through third examples, and further includes wherein the pre-chamber includes a bottom aperture shaped to receive the protrusion of the piston, and wherein the pre-chamber is open to the combustion chamber via the bottom aperture. A fifth example of the system optionally includes one or more or each of the first through fourth examples, and further includes a first squish region formed by the cylinder head, wherein the first squish region extends vertically below a topmost surface of the combustion chamber in a direction of a central axis of the combustion chamber, and wherein the pre-chamber is formed by the first squish region. A sixth example of the system optionally includes one or more or each of the first through fifth examples, and further includes a second squish region formed by the cylinder head and positioned opposite to the first squish region in a direction perpendicular to the central axis of the combustion chamber.

In one embodiment, a method includes: during a single combustion cycle: flowing a combustible gas into a main chamber of a cylinder capped by a cylinder head; flowing the combustible gas into a pre-chamber fluidly coupled with the cylinder and extending away from the cylinder head and into the cylinder; and compressing the combustible gas within the pre-chamber by pressing a protrusion of a piston into the pre-chamber. In a first example of the method, flowing the combustible gas into the main chamber and into the pre-chamber includes mixing the combustible gas with fuel within the cylinder or within an intake port upstream of the cylinder to form a gas/fuel mixture. A second example of the method optionally includes the first example, and further includes: igniting the gas/fuel mixture within the pre-chamber to form a partially combusted mixture; and driving the partially combusted mixture through orifices formed by a sidewall of the pre-chamber and into the main chamber. A third example of the method optionally includes one or both of the first and second examples, and further includes: igniting the gas/fuel mixture within the main chamber by mixing the gas/fuel mixture with the partially combusted mixture. A fourth example of the method optionally includes one or more or each of the first through third examples, and further includes wherein igniting the combustible gas within the pre-chamber includes igniting the gas/fuel mixture by auto-ignition via pressing the protrusion of the piston into the pre-chamber. A fifth example of the method optionally includes one or more or each of the first through fourth examples, and further includes wherein igniting the gas/fuel mixture within the pre-chamber includes actuating a pre-chamber spark plug partially disposed within the pre-chamber and coupled with the cylinder head to produce a spark within the pre-chamber. A sixth example of the method optionally includes one or more or each of the first through fifth examples, and further includes adjusting a pre-chamber spark timing in a first mode responsive to a temperature of an emission control device being below a first threshold temperature, wherein the first mode includes actuating the spark plug to produce a spark after the piston is in a top-dead-center position of a compression stroke of the single combustion cycle and before the piston is in a bottom-dead-center position of a power stroke of the single combustion cycle. A seventh example of the method optionally includes one or more or each of the first through sixth examples, and further includes adjusting the pre-chamber spark timing in a second mode responsive to an amount of EGR gases within the cylinder being below a threshold amount, wherein the second mode includes actuating the spark plug to produce a spark after the piston is in a bottom-dead-center position of a compression stroke of the single combustion cycle and before the protrusion is pressed into the pre-chamber during the compression stroke of the single combustion cycle. An eighth example of the method optionally includes one or more or each of the first through seventh examples, and further includes adjusting the pre-chamber spark timing in a third mode responsive to the amount of EGR gases within the cylinder being above the threshold amount and an engine load being below a threshold load, wherein the third mode includes actuating the spark plug to produce a spark after the protrusion is pressed into the pre-chamber during a compression stroke of the single combustion cycle and before the piston is in a top-dead-center position of the compression stroke of the single combustion cycle. A ninth example of the method optionally includes one or more or each of the first through eighth examples, and further includes adjusting the pre-chamber spark timing in a third mode responsive to the amount of EGR gases within the cylinder being above the threshold amount and the engine load being above the threshold load, wherein the fourth mode includes actuating the spark plug to produce a plurality of sparks or an extended duration spark after the piston is in a bottom-dead-center position of a compression stroke of the single combustion cycle and before the protrusion is pressed into the pre-chamber during the compression stroke of the single combustion cycle. A tenth example of the method optionally includes one or more or each of the first through ninth examples, and further includes wherein igniting the gas/fuel mixture within the main chamber includes actuating a main chamber spark plug coupled with the cylinder head and disposed within the main chamber, and wherein a main chamber spark timing is adjusted responsive to a pre-chamber spark timing.

In another embodiment, a system includes: a combustion chamber formed by a cylinder capped by a cylinder head; a pre-chamber formed by the cylinder head, the pre-chamber extending away from the cylinder head and into the cylinder; a piston disposed within the cylinder, the piston including a protrusion shaped to fit within the pre-chamber; a first spark plug coupled with the cylinder head and including a tip disposed within the pre-chamber; and a controller including computer-readable instructions for: adjusting a spark timing of the first spark plug in response to engine operating conditions. In a first example of the system, the system includes a second spark plug coupled with the cylinder head and including a tip disposed within the combustion chamber at a location external to the pre-chamber, and wherein the controller includes computer-readable instructions for adjusting a spark timing of the second spark plug in response to engine operating conditions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a combustion chamber formed by a cylinder capped by a cylinder head;
a pre-chamber formed by the cylinder head, the pre-chamber extending away from the cylinder head and into the cylinder and including a bottom aperture shaped to receive a protrusion of a piston;
the piston disposed within the cylinder, the piston including the protrusion shaped to fit within the pre-chamber; and
a plurality of orifices formed in a sidewall of the pre-chamber positioned above the protrusion.

2. The system of claim 1, further comprising a first spark plug coupled with the cylinder head at a first location, wherein a tip of the first spark plug is disposed within the pre-chamber.

3. The system of claim 2, further comprising a second spark plug coupled with the cylinder head at a second location, and wherein a tip of the second spark plug is disposed within the combustion chamber at a second location external to the pre-chamber.

4. The system of claim 3, wherein the pre-chamber is open to the combustion chamber via the bottom aperture.

5. The system of claim 1, further comprising a first squish region formed by the cylinder head, wherein the first squish region extends vertically from a topmost surface of the combustion chamber, and wherein the pre-chamber is formed by the first squish region.

6. The system of claim 5, further comprising a second squish region formed by the cylinder head and positioned opposite to the first squish region.

7. A method, comprising:
during a single combustion cycle:
flowing a combustible gas into a main chamber of a cylinder capped by a cylinder head;
flowing the combustible gas into a pre-chamber fluidly coupled with the cylinder and extending away from the cylinder head and into the cylinder; and
compressing the combustible gas within the pre-chamber by pressing a protrusion of a piston into the pre-chamber; and
driving the combustible gas through orifices formed in a sidewall of the pre-chamber and into the main chamber using the compression by the protrusion.

8. The method of claim 7, wherein flowing the combustible gas into the main chamber and into the pre-chamber includes mixing the combustible gas with fuel within the cylinder or within an intake port upstream of the cylinder to form a gas/fuel mixture.

9. The method of claim 8, further comprising:
igniting the gas/fuel mixture within the pre-chamber to form a partially combusted mixture; and wherein the driving the combustible gas through the orifices includes the partially combusted mixture.

10. The method of claim 9, further comprising:
igniting the gas/fuel mixture within the main chamber by mixing the gas/fuel mixture with the partially combusted mixture.

11. The method of claim 10, wherein igniting the combustible gas within the pre-chamber includes igniting the gas/fuel mixture by auto-ignition via pressing the protrusion of the piston into the pre-chamber.

12. The method of claim 10, wherein igniting the gas/fuel mixture within the pre-chamber includes actuating a pre-chamber spark plug partially disposed within the pre-chamber and coupled with the cylinder head to produce a spark within the pre-chamber.

13. The method of claim 12, further comprising adjusting a pre-chamber spark timing in a first mode responsive to a temperature of an emission control device being below a first threshold temperature, wherein the first mode includes actuating the spark plug to produce a spark after the piston is in a top-dead-center position of a compression stroke of the single combustion cycle and before the piston is in a bottom-dead-center position of a power stroke of the single combustion cycle.

14. The method of claim 13, further comprising adjusting the pre-chamber spark timing in a second mode responsive to an amount of EGR gases within the cylinder being below a threshold amount, wherein the second mode includes actuating the spark plug to produce a spark after the piston is in a bottom-dead-center position of the compression stroke of the single combustion cycle and before the protrusion is pressed into the pre-chamber during the compression stroke of the single combustion cycle.

15. The method of claim 14, further comprising adjusting the pre-chamber spark timing in a third mode responsive to the amount of EGR gases within the cylinder being above the threshold amount and an engine load being below a threshold load, wherein the third mode includes actuating the spark plug to produce a spark after the protrusion is pressed into the pre-chamber during the compression stroke of the single combustion cycle and before the piston is in the top-dead-center position of the compression stroke of the single combustion cycle.

16. The method of claim 15, further comprising adjusting the pre-chamber spark timing in the third mode responsive to the amount of EGR gases within the cylinder being above the threshold amount and the engine load being above the threshold load, wherein in a fourth mode includes actuating the spark plug to produce a plurality of sparks or an extended duration spark after the piston is in the bottom-dead-center position of the compression stroke of the single combustion cycle and before the protrusion is pressed into the pre-chamber during the compression stroke of the single combustion cycle.

17. The method of claim 12, wherein igniting the gas/fuel mixture within the main chamber includes actuating a main chamber spark plug coupled with the cylinder head and disposed within the main chamber, and wherein a main chamber spark timing is adjusted responsive to a pre-chamber spark timing.

18. A system, comprising:
- a combustion chamber formed by a cylinder capped by a cylinder head;
- a pre-chamber formed by the cylinder head, the pre-chamber extending away from the cylinder head and into the cylinder;
- a piston disposed within the cylinder, the piston including a protrusion shaped to fit within the pre-chamber;
- a first spark plug coupled with the cylinder head and including a tip disposed within the pre-chamber; and
- a controller including computer-readable instructions for:
    - adjusting a spark timing of the first spark plug in relation to a position of the protrusion within the pre-chamber wherein the adjusting is in response to engine operating conditions including an amount of EGR gases within the cylinder.

19. The system of claim 18, further comprising a second spark plug coupled with the cylinder head and including a tip disposed within the combustion chamber at a location external to the pre-chamber, and wherein the controller includes computer-readable instructions for adjusting a spark timing of the second spark plug in response to engine operating conditions.

* * * * *